(12) United States Patent
Tarpeh et al.

(10) Patent No.: US 12,703,650 B2
(45) Date of Patent: Aug. 11, 2026

(54) APPARATUS AND METHODS FOR NITROGEN REDUCTION IN WASTEWATER

(71) Applicant: The Board of Trustees of the Leland Stanford Junior University, Stanford, CA (US)

(72) Inventors: William A. Tarpeh, Union City, CA (US); Matthew Junjie Liu, Stanford, CA (US); Brandon D. Clark, Attleboro, MA (US)

(73) Assignee: The Board of Trustees of the Leland Stanford Junior University, Stanford, CA (US)

(*) Notice: Subject to any disclaimer, the term of this patent is extended or adjusted under 35 U.S.C. 154(b) by 748 days.

(21) Appl. No.: 18/041,769

(22) PCT Filed: Aug. 13, 2021

(86) PCT No.: PCT/US2021/046015
§ 371 (c)(1),
(2) Date: Feb. 15, 2023

(87) PCT Pub. No.: WO2022/040051
PCT Pub. Date: Feb. 24, 2022

(65) Prior Publication Data

US 2023/0365444 A1 Nov. 16, 2023

Related U.S. Application Data

(60) Provisional application No. 63/066,291, filed on Aug. 16, 2020.

(51) Int. Cl.
*C02F 1/469* (2023.01)
*B01D 61/46* (2006.01)
(Continued)

(52) U.S. Cl.
CPC .......... *C02F 1/4693* (2013.01); *B01D 61/461* (2022.08); *C02F 1/46109* (2013.01);
(Continued)

(58) Field of Classification Search
CPC .. C02F 1/4693; C02F 1/46109; C02F 1/4676; C02F 2101/16; C02F 2101/163; C02F 2201/46115; B01D 61/461
See application file for complete search history.

(56) References Cited

U.S. PATENT DOCUMENTS 4,911,804 A 3/1990 Dickson
8,152,988 B2 4/2012 Aulich et al.
(Continued)

FOREIGN PATENT DOCUMENTS

CN 112520818 A 3/2021
DE 19815669 A1 10/1999
(Continued)

OTHER PUBLICATIONS

Udert et al., "Complete nutrient recovery from source-separated urine by nitrification and distillation", Water Research, vol. 46, No. 2, Feb. 1, 2012, pp. 453-464, doi: 10.1016/j.watres.2011.11.020.
(Continued)

*Primary Examiner* — Ciel P Contreras
(74) *Attorney, Agent, or Firm* — KPPB

(57) ABSTRACT

An apparatus and method for extracting nitrogen including compounds from wastewater is disclosed herein. The methods and apparatus use molecularly designed selective electrocatalysts, electrolytes, and separation reactors to enable automated, distributed ammonia manufacturing with minimal environmental impacts. In some embodiments, a method of nitrogen reduction of wastewater is provided. The method includes: providing an apparatus including: a first chamber comprising a salt solution; a second chamber
(Continued)

comprising a wastewater source; a third chamber comprising a salt solution and a third electrode, wherein the second chamber is positioned between the first chamber and the third chamber; an anion exchange membrane positioned between the first chamber and the second chamber; and a cation exchange membrane positioned between the second chamber and the third chamber; applying a potential bias between any two of the first chamber, the second chamber, and the third chamber.

20 Claims, 16 Drawing Sheets

(51) Int. Cl.
*C02F 1/461* (2023.01)
*C02F 1/467* (2023.01)
*C02F 101/16* (2006.01)
*C05C 3/00* (2006.01)

(52) U.S. Cl.
CPC .............. *C02F 1/4676* (2013.01); *C05C 3/00* (2013.01); *C02F 2001/46142* (2013.01); *C02F 2101/16* (2013.01); *C02F 2101/163* (2013.01); *C02F 2201/46115* (2013.01)

(56) References Cited

U.S. PATENT DOCUMENTS 9,551,076 B2 1/2017 Buschmann
10,125,428 B2 11/2018 Barak
2008/0292912 A1 11/2008 Logan et al.
2010/0051542 A1 3/2010 Elektorowicz et al.
2011/0281139 A1* 11/2011 Huang .................. B01D 61/44 204/522
2013/0168262 A1 7/2013 Reyter et al.
2013/0228457 A1 9/2013 Bilbao et al.
2020/0198995 A1 6/2020 Ganzi et al.
2024/0025776 A1 1/2024 Tarpeh et al.

FOREIGN PATENT DOCUMENTS

EP 2802684 B1 10/2018
WO 2020028570 A1 2/2020
WO 2022036326 A1 2/2022
WO 2022040051 A1 2/2022

OTHER PUBLICATIONS

Udert et al., “Fate of major compounds in source-separated urine”, Water Science & Technology, vol. 54, No. 11-12, Dec. 1, 2006, pp. 413-420, doi: 10.2166/wst.2006.921.
Wang et al., “Nitrogen recovery from low-strength wastewater by combined membrane capacitive deionization (MCDI) and ion exchange (IE) process”, Chemical Engineering Journal, vol. 316, May 15, 2017, pp. 1-6, doi: 10.1016/j.cej.2017.01.082.
Weatherley et al., “Comparison of the ion exchange uptake of ammonium ion onto New Zealand clinoptilolite and mordenite”, Water Research, vol. 38, No. 20, Dec. 2004, pp. 4305-4312, doi: 10.1016/j.watres.2004.08.026.
Zhang et al., “Ammonia-Rich Solution Production from Wastewaters Using Chemical-Free Flow-Electrode Capacitive Deionization”, ACS Sustainable Chemistry & Engineering, vol. 7, No. 7, Mar. 7, 2019, pp. 6480-6485, doi: 10.1021/acssuschemeng.9b00314.
Zhang et al., “Capacitive Membrane Stripping for Ammonia Recovery (CapAmm) from Dilute Wastewaters”, Environmental Science & Technology Letters, vol. 5, No. 1, Dec. 21, 2017, pp. 43-49, doi: 10.1021/acs.estlett.7b00534.
Zhang et al., “Continuous Ammonia Recovery from Wastewaters Using an Integrated Capacitive Flow Electrode Membrane Stripping System”, Environmental Science & Technology, vol. 52, No. 24, Nov. 21, 2018, pp. 14275-14285, doi: 10.1021/acs.est.8b02743.
Zhao et al., “TiO2-based catalysts for photocatalytic reduction of aqueous oxyanions: State-of-the-art and future prospects”, Environment International, vol. 136, Article 105453, Mar. 2020, 17 pgs., doi: 10.1016/j.envint.2019.105453.
International Preliminary Report on Patentability received for International Application No. PCT/US2021/046015, Report issued Feb. 16, 2023, Mailed on Mar. 2, 2023, 6 pgs.
International Preliminary Report on Patentability received for International Application No. PCT/US2021/046167, Report issued Feb. 7, 2023, Mailed on Feb. 23, 2023, 8 pgs.
International Search Report and Written Opinion received for International Application No. PCT/US2021/046015, Search completed Oct. 11, 2021, Mailed on Nov. 22, 2021, 12 pgs.
International Search Report and Written Opinion received for International Application No. PCT/US2021/046167, Search completed Oct. 22, 2021, Mailed on Jan. 5, 2022, 17 pgs.
“Biological Nutrient Removal Processes and Cost”, United States Environmental Protection Agency, Jun. 2007, 15 pgs.
“Nutrient Control Design Manual: State of Technology Review Report”, United States Environmental Protection Agency, Jan. 2009, 104 pgs.
Abbott et al., “Iridium Oxide for the Oxygen Evolution Reaction: Correlation between Particle Size, Morphology, and the Surface Hydroxo Layer from Operando XAS”, Chemistry of Materials, vol. 28, No. 18, Aug. 29, 2016, pp. 6591-6604, doi: 10.1021/acs.chemmater.6b02625.
Başakçilardan-Kabakci et al., “Recovery of Ammonia from Human Urine by Stripping and Absorption”, Environmental Engineering Science, vol. 24, No. 5, May 22, 2007, pp. 615-624, doi: 10.1089/ees.2006.0412.
Baum et al., “Sanitation: A Global Estimate of Sewerage Connections without Treatment and the Resulting Impact on MDG Progress”, Environmental Science & Technology, vol. 47, No. 4, Jan. 16, 2013, pp. 1994-2000, doi: 10.1021/es304284f.
Baykal et al., “The effect of initial loading on the removal of ammonium and potassium from source-separated human urine via clinoptilolite”, Water Science & Technology, vol. 60, No. 10, Nov. 2009, pp. 2515-2520, doi: 10.2166/wst.2009.614.
Beler-Baykal et al., “Ion exchange with clinoptilolite to control ammonium in drinking water”, Journal of Water Supply: Research and Technology—AQUA, vol. 56, No. 8, Dec. 2007, pp. 541-547, doi: 10.2166/aqua.2007.070.
Chen, “Electrochemical technologies in wastewater treatment”, Separation and Purification Technology, vol. 38, No. 1, Jul. 15, 2004, pp. 11-41, doi: 10.1016/j.seppur.2003.10.006.
Chen et al., “Biological treatment of a synthetic space mission wastewater using a membrane-aerated, membrane-coupled bioreactor (M2BR)”, Journal of Industrial Microbiology and Biotechnology, vol. 35, No. 6, Jun. 1, 2008, pp. 465-473, doi: 10.1007/s10295-008-0302-4.
Chrispim et al., “The sanitation and urban agriculture nexus: urine collection and application as fertilizer in Sao Paulo, Brazil”, Journal of Water, Sanitation and Hygiene for Development, vol. 7, No. 3, Sep. 2017, pp. 455-465, doi: 10.2166/washdev.2017.163.
Cid et al., “Phosphate Recovery from Human Waste via the Formation of Hydroxyapatite during Electrochemical Wastewater Treatment”, ACS Sustainable Chemistry & Engineering, vol. 6, No. 3, Feb. 5, 2018, pp. 3135-3142, doi: 10.1021/acssuschemeng.7b03155.
Comisso et al., “Electrodeposition of Cu—Rh alloys and their use as cathodes for nitrate reduction”, Electrochemistry Communications, vol. 25, Nov. 2012, pp. 91-93, doi: 10.1016/j.elecom.2012.09.026.
Da Cunha et al., “Reaction Pathways for Reduction of Nitrate Ions on Platinum, Rhodium, and Platinum-Rhodium Alloy Electrodes”, Langmuir, vol. 16, No. 2, Nov. 12, 1999, pp. 771-777, doi: 10.1021/la990638s.
Daigger, “Oxygen and Carbon Requirements for Biological Nitrogen Removal Processes Accomplishing Nitrification, Nitritation,

(56) References Cited

OTHER PUBLICATIONS and Anammox", Water Environment Research, vol. 86, No. 3, Mar. 2014, pp. 204-209, doi: 10.2175/106143013X13807328849459.
Decrey et al., "Ammonia as an In Situ Sanitizer: Inactivation Kinetics and Mechanisms of the ssRNA Virus MS2 by NH3", Environmental Science & Technology, vol. 49, No. 2, Dec. 12, 2014, pp. 1060-1067, doi: 10.1021/es5044529.
Desloover et al., "Electrochemical Nutrient Recovery Enables Ammonia Toxicity Control and Biogas Desulfurization in Anaerobic Digestion", Environmental Science & Technology, vol. 49, No. 2, Dec. 17, 2014, pp. 948-955, doi: 10.1021/es504811a.
Desloover et al., "Electrochemical Resource Recovery from Digestate to Prevent Ammonia Toxicity during Anaerobic Digestion", Environmental Science & Technology, vol. 46, No. 21, Oct. 10, 2012, pp. 12209-12216, doi: 10.1021/es3028154.
Dhir et al., "Nucleate Pool Boiling Experiments (NPBX) on the International Space Station", Microgravity Science and Technology, vol. 24, Jul. 19, 2012, pp. 307-325, doi: 10.1007/s12217-012-9315-8.
Dodds et al., "Eutrophication of U.S. Freshwaters: Analysis of Potential Economic Damages", Environmental Science & Technology, vol. 43, No. 1, Nov. 12, 2008, pp. 12-19, doi: 10.1021/es801217q.
Dykstra et al., "Theory of ion transport with fast acid-base equilibrations in bioelectrochemical systems", Physical Review E, vol. 90, Article 013302, Jul. 2, 2014, 10 pgs., doi: 10.1103/PhysRevE.90.013302.
Etter et al., "Low-cost struvite production using source-separated urine in Nepal", Water Research, vol. 45, No. 2, Jan. 2011, pp. 852-862, doi: 10.1016/j.watres.2010.10.007.
Feng et al., "Electrochemical Technologies for Wastewater Treatment and Resource Reclamation", Environmental Science: Water Research & Technology, vol. 2, No. 5, 2016, pp. 800-831, doi: 10.1039/C5EW00289C.
Fields, "Global Nitrogen: Cycling out of Control", Environmental Health Perspectives, vol. 112, No. 10, Jul. 2004, pp. A556-A563, doi: 10.1289/ehp.112-a556.
Friedler et al., "Wastewater composition", Chapter 17, Source Separation and Decentralization for Wastewater Management, IWA Publishing, Jan. 2013, pp. 241-257, doi: 10.2166/9781780401072.
Fumasoli et al., "Operating a pilot-scale nitrification/distillation plant for complete nutrient recovery from urine", Water Science & Technology, vol. 73, No. 1, Jan. 8, 2016, pp. 215-222, doi: 10.2166/wst.2015.485.
Galloway et al., "Transformation of the Nitrogen Cycle: Recent Trends, Questions, and Potential Solutions", Science, vol. 320, No. 5878, May 16, 2008, pp. 889-892, doi: 10.1126/science.1136674.
Gao et al., "Enhanced reduction of nitrate by noble metal-free electrocatalysis on P doped three-dimensional Co3O4 cathode: Mechanism exploration from both experimental and DFT studies", Chemical Engineering Journal, vol. 382, Article 123034, Feb. 15, 2020, 41 pgs., doi: 10.1016/j.cej.2019.123034.
Gao et al., "Towards energy neutral wastewater treatment: methodology and state of the art", Environment Science: Processes & Impacts, vol. 16, No. 6, 2014, pp. 1223-1246, doi: 10.1039/c4em00069b.
Garcia-Segura et al., "Electrocatalytic reduction of nitrate: Fundamentals to full-scale water treatment applications", Applied Catalysis B: Environmental, vol. 236, Nov. 15, 2018, pp. 546-568, doi: 10.1016/j.apcatb.2018.05.041.
Guest et al., "A New Planning and Design Paradigm to Achieve Sustainable Resource Recovery from Wastewater", Environmental Science & Technology, vol. 43, No. 16, Jul. 14, 2009, pp. 6126-6130, doi: 10.1021/es9010515.
He et al., "Advances in microbial fuel cells for wastewater treatment", Renewable and Sustainable Energy Reviews, vol. 71, May 2017, pp. 388-403, doi: 10.1016/j.rser.2016.12.069.
Hemsworth et al., "Rate Constants at 297° K for Proton Transfer Reactions with NH3. Comparisons with Classical Theories and Exothermicity", Chemical Physics Letters, vol. 26, No. 3, Jun. 1, 1974, pp. 417-421, doi: 10.1016/0009-2614(74)89061-5.
Huang et al., "Simultaneous removal of nutrients from simulated swine wastewater by adsorption of modified zeolite combined with struvite crystallization", Chemical Engineering Journal, vol. 256, Nov. 15, 2014, pp. 431-438, doi: 10.1016/j.cej.2014.07.023.
Hug et al., "Struvite precipitation from urine with electrochemical magnesium dosage", Water Research, vol. 47, No. 1, Jan. 1, 2013, pp. 289-299, doi: 10.1016/j.watres.2012.09.036.
Ichijo et al., "Four-year bacterial monitoring in the International Space Station—Japanese Experiment Module "Kibo" with culture-independent approach", Microgravity, vol. 2, Article 16007, Apr. 21, 2016, 6 pgs., doi: 10.1038/npjmgrav.2016.7.
Ieropoulos et al., "Urine Utilisation by Microbial Fuel Cells; energy fuel for the future.", Physical Chemistry Chemical Physics, vol. 14, 2012, pp. 94-98, doi: 10.1039/c1cp23213d.
Ippersiel et al., "Nitrogen potential recovery and concentration of ammonia from swine manure using electrodialysis coupled with air stripping", Journal of Environmental Management, vol. 95, Supplement, Mar. 2012, pp. S165-S169, doi: 10.1016/j.jenvman.2011.05.026.
Ishii et al., "Life cycle comparison of centralized wastewater treatment and urine source separation with struvite precipitation: Focus on urine nutrient management", Water Research, vol. 79, Aug. 1, 2015, pp. 88-103, doi: 10.1016/j.watres.2015.04.010.
Iskander et al., "Resource recovery from landfill leachate using bioelectrochemical systems: Opportunities, challenges, and perspectives", Bioresource Technology, vol. 201, Feb. 2016, pp. 347-354, doi: 10.1016/j.biortech.2015.11.051.
Jenkins et al., "Inactivation of Cryptosporidium parvum Oocysts by Ammonia", Applied and Environmental Microbiology, vol. 64, No. 2, Feb. 1, 1998, pp. 784-788, doi: 10.1128/aem.64.2.784-788.1998.
Jermakka et al., "Potential Technologies for the Removal and Recovery of Nitrogen Compounds From Mine and Quarry Waters in Subarctic Conditions", Critical Reviews in Environmental Science and Technology, vol. 45, No. 7, 2015, pp. 703-748, doi: 10.1080/10643389.2014.900238.
Jiang et al., "A review of reverse osmosis membrane fouling and control strategies", Science of The Total Environment, vol. 595, Oct. 1, 2017, pp. 567-583, doi: 10.1016/j.scitotenv.2017.03.235.
Kavvada et al., "Life-cycle cost and environmental assessment of decentralized nitrogen recovery using ion exchange from source-separated urine through spatial modeling", Environmental Science & Technology, vol. 51, No. 21, Sep. 26, 2017, pp. 12061-12071, doi: 10.1021/acs.est.7b02244.
Kemp et al., "Eutrophication of Chesapeake Bay: historical trends and ecological interactions", Marine Ecology Progress Series, vol. 303, Nov. 21, 2005, pp. 1-29., doi: 10.3354/meps303001.
Khabarov et al., "Global Phosphorus Fertilizer Market and National Policies: A Case Study Revisiting the 2008 Price Peak", Frontiers in Nutrition, vol. 4, Article 22, Jun. 14, 2017, 8 pgs., doi: 10.3389/fnut.2017.00022.
Kuntke et al., "Ammonium recovery and energy production from urine by a microbial fuel cell", Water Research, vol. 46, No. 8, May 15, 2012, pp. 2627-2636, doi: 10.1016/j.watres.2012.02.025.
Lackner et al., "Full-scale partial nitritation/anammox experiences—An application survey", Water Research, vol. 55, May 15, 2014, pp. 292-303, doi: 10.1016/j.watres.2014.02.032.
Lahav et al., "Sustainable removal of ammonia from anaerobic-lagoon swine waste effluents using an electrochemically-regenerated ion exchange process", Chemical Engineering Journal, vol. 218, Feb. 15, 2013, pp. 214-222, doi: 10.1016/j.cej.2012.12.043.
Larsen et al., "Emerging solutions to the water challenges of an urbanizing world", Science, vol. 352, No. 6288, May 20, 2016, pp. 928-933, doi: 10.1126/science.aad8641.
Larsen et al., "Separate Management of Anthropogenic Nutrient Solutions (Human Urine)", Water Science and Technology, vol. 34, No. 3-4, 1996, pp. 87-94, doi: 1016/0273-1223(96)00560-4.
Larsen et al., "Source Separation: Will We See a Paradigm Shift in Wastewater Handling?", Environmental Science & Technology, vol. 43, No. 16, Jul. 14, 2009, pp. 6121-6125, doi: 10.1021/es803001r.

(56) References Cited

OTHER PUBLICATIONS

Ledezma et al., "Source-separated urine opens golden opportunities for microbial electrochemical technologies", Trends in Biotechnology, vol. 33, No. 4, Apr. 2015, pp. 214-220, doi: 10.1016/j.tibtech.2015.01.007.
Li et al., "Quantitative Evaluation of an Integrated System for Valorization of Wastewater Algae as Bio-oil, Fuel Gas, and Fertilizer Products", Environmental Science & Technology, vol. 52, No. 21, Sep. 26, 2018, pp. 12717-12727, doi: 10.1021/acs.est.8b04035.
Li et al., "Recovery of ammonium-nitrogen from landfill leachate as a multi-nutrient fertilizer", Ecological Engineering, vol. 20, No. 2, May 2003, pp. 171-181, doi: 10.1016/S0925-8574(03)00012-0.
Liao et al., "Removal of Nitrogen From Swine Manure Wastewaters by Ammonia Stripping", Bioresource Technology, vol. 54, No. 1, 1995, pp. 17-20, doi: 10.1016/0960-8524(95)00105-0.
Liu et al., "Activity and Selectivity Trends in Electrocatalytic Nitrate Reduction on Transition Metals", ACS Catalysis, vol. 9, No. 8, Jun. 25, 2019, pp. 7052-7064, doi: 10.1021/acscatal.9b02179.
Liu et al., "Building an operational framework for selective nitrogen recovery via electrochemical stripping", Water Research, vol. 169, Article 115226, Feb. 1, 2020, 36 pgs., doi: 10.1016/j.watres.2019.115226.
Luther et al., "Electrochemically driven extraction and recovery of ammonia from human urine", Water Research, vol. 87, Dec. 15, 2015, pp. 367-377, doi: 10.1016/j.watres.2015.09.041.
Macova et al., "Electrocatalytic activity of copper alloys for NO3-reduction in a weakly alkaline solution: Part 2: Copper-tin", Journal of Applied Electrochemistry, vol. 37, Jan. 13, 2007, pp. 557-566, doi: 10.1007/s10800-006-9287-8.
Martínez et al., "State-of-the-art and perspectives of the catalytic and electrocatalytic reduction of aqueous nitrates", Applied Catalysis B: Environmental, vol. 207, Jun. 15, 2017, pp. 42-59, doi: 10.1016/j.apcatb.2017.02.016.
Maurer et al., "Nutrients in urine: energetic aspects of removal and recovery", Water Science and Technology, vol. 48, No. 1, 2003, pp. 37-46, doi: 10.2166/wst.2003.0011.
Mccarty et al., "Domestic Wastewater Treatment as a Net Energy Producer—Can This Be Achieved?", Environmental Science & Technology, vol. 45, Jul. 12, 2011, pp. 7100-7106, doi: 10.1021/es2014264.
Mikhaylin et al., "Fouling on ion-exchange membranes: Classification, characterization and strategies of prevention and control", Advances in Colloid and Interface Science, vol. 229, Mar. 2016, pp. 34-56, doi: 10.1016/j.cis.2015.12.006.
Moran, "New Nutrients Requirements on Wastewater to San Francisco Bay", California Environmental Protection Agency Media Release, San Francisco, CA Feb. 7, 2014, 1 pg.
Muckle et al., "Characterization of Spacecraft Humidity Condensate", SAE Transactions, vol. 102, 1993, pp. 1115-1129, doi: 10.4271/932176.
Nelson et al., "Sanitation for Unserved Populations: Technologies, Implementation Challenges, and Opportunities", Annual Review of Environment and Resources, vol. 33, 2008, pp. 119-151, doi: 10.1146/annurev.environ.33.022007.145142.
Nixon, "Coastal marine eutrophication: A definition, social causes, and future concerns", Ophelia, vol. 41, No. 1, Feb. 1995, pp. 199-219, doi: 10.1080/00785236.1995.10422044.
Norskov, "Sustainable Ammonia Synthesis", Stanford | Engineering, National Accelerator Laboratory, Department of Energy, 2016, 25 pgs.
Nyenje et al., "Eutrophication and nutrient release in urban areas of sub-Saharan Africa—A review", Science of The Total Environment, vol. 408, No. 3, Jan. 1, 2010, pp. 447-455, doi: 10.1016/j.scitotenv.2009.10.020.
Ogunyoku et al., "In-toilet disinfection of fresh fecal sludge with ammonia naturally present in excreta", Journal of Water, Sanitation and Hygiene for Development, vol. 6, No. 1, Mar. 1, 2016, pp. 104-114, doi: 10.2166/washdev.2015.233.
Pecson et al., "Inactivation of Ascaris suum Eggs by Ammonia", Environmental Science & Technology, vol. 39, No. 20, Sep. 9, 2005, pp. 7909-7914, doi: 10.1021/es050659a.
Perez-Coronado et al., "Control of selectivity in the reduction of nitrate by shielding of Pd—Cu/C catalysts with AOT", Journal of Industrial and Engineering Chemistry, vol. 82, Feb. 25, 2020, pp. 42-49, doi: 10.1016/j.jiec.2019.09.039.
Polatides et al., "Electrochemical reduction of nitrate ion on various cathodes—reaction kinetics on bronze cathode", Journal of Applied Electrochemistry, vol. 35, May 2005, pp. 421-427, doi: 10.1007/s10800-004-8349-z.
Pronk et al., "Treatment of source-separated urine by a combination of bipolar electrodialysis and a gas transfer membrane", Water Science & Technology, vol. 53, No. 3, Feb. 1, 2006, pp. 139-146, doi: 10.2166/wst.2006.086.
Qin et al., "Recovery of Nitrogen and Water from Landfill Leachate by a Microbial Electrolysis Cell—Forward Osmosis System", Bioresource Technology, vol. 200, Jan. 2016, pp. 485-492, doi: 10.1016/j.biortech.2015.10.066.
Rosca et al., "Nitrogen Cycle Electrocatalysis", Chemical Reviews, vol. 109, No. 6, May 13, 2009, pp. 2209-2244, doi: 10.1021/cr8003696.
Schoen et al., "Cost, energy, global warming, eutrophication and local human health impacts of community water and sanitation service options", Water Research, vol. 109, Feb. 1, 2017, pp. 186-195, doi: 10.1016/j.watres.2016.11.044.
Shih et al., "Electrochemical nitrate reduction as affected by the crystal morphology and facet of copper nanoparticles supported on nickel foam electrodes (Cu/Ni)", Chemical Engineering Journal, vol. 383, Article 123157, Mar. 1, 2020, 11 pgs., doi: 10.1016/j.cej.2019.123157.
Sid et al., "Cost minimization in a full-scale conventional wastewater treatment plant: associated costs of biological energy consumption versus sludge production", Water Science & Technology, vol. 76, No. 9, Nov. 16, 2017, pp. 2473-2481, doi: 10.2166/wst.2017.423.
Siegrist, "Nitrogen Removal From Digester Supernatant—Comparison Of Chemical And Biological Methods", Water Science and Technology, vol. 34, No. 1-2, 1996, pp. 399-406, doi: 10.1016/0273-1223(96)00529-X.
Singh et al., "Electrochemical Ammonia Synthesis—The Selectivity Challenge", ACS Catalysis, vol. 7, No. 1, Dec. 7, 2016, pp. 706-709. doi: 10.1021/acscatal.6b03035.
Singh et al., "Role of Electrocatalysis in the Remediation of Water Pollutants", ACS Catalysis, vol. 10, No. 5, Feb. 11, 2020, pp. 3365-3371, doi: 10.1021/acscatal.9b04167.
Tarpeh et al., "Comparing ion exchange adsorbents for nitrogen recovery from source-separated urine", Environmental Science and Technology, vol. 51, No. 4, Jan. 18, 2017, pp. 2373-2381, doi: 10.1021/acs.est.6b05816.
Tarpeh et al., "Effects of operating and design parameters on ion exchange columns for nutrient recovery from urine", Environmental Science: Water Research & Technology, vol. 8, No. 6, 2018, pp. 828-838, doi: 10.1039/C7EW00478H.
Tarpeh et al., "Electrochemical stripping to recover nitrogen from source-separated urine", Environmental Science & Technology, vol. 52, No. 3, Jan. 5, 2018, pp. 1453-1460, doi: 10.1021/acs.est.7b05488.
Tarpeh et al., "Evaluating ion exchange for nitrogen recovery from source-separated urine in Nairobi, Kenya", Development Engineering, vol. 3, 2018, pp. 188-195, doi: 10.1016/j.deveng.2018.07.002.
Tokazhanov et al., "Advances in the catalytic reduction of nitrate by metallic catalysts for high efficiency and N2 selectivity: A review", Chemical Engineering Journal, vol. 384, Article 123252, Mar. 15, 2020, 49 pgs., doi: 1016/j.cej.2019.123252.

* cited by examiner 316
308
312
310
V
CE
WE
314
ANODE CHAMBER
Wastewater containing
$NH_4^+$
$2H_2O \rightarrow O_2 + 4H^+ + 4e^-$
CATHODE CHAMBER
100 mM NaCl
$O_2 + 2H_20 + 4e^- \rightarrow 4 HO^-$
$2H_2O + 2e^- \rightarrow H_2 + 2 HO$
TRAP CHAMBER
50 mM-1000 mM $H_2SO_4$
302
$NH_{3(g)} \rightarrow NH_{3(g)}$
$NH_4^+ \rightarrow NH_4^+ \xrightarrow{HO^-} NH_{3(aq)}$
$NH_{3(aq)} \xrightarrow{H^+} NH_4^+$
Cation Exchange Membrane
Gas Permeable Membrane
304
306

1. Disinfectant Production
2. Anion Migration
3. Nitrate Reduction
4. Fertilizer Production
= acidic
= basic
= anion exchange membrane
= cation exchange membrane
400a
400b
400c
400d
402
404
406
408
410
$NH_4^+$
$HO^-$
$NH_{3(aq)}$
$NO_3^-$
$PO_4^{3-}$
$NH_3$ (aq)
$H_2PO_4^-$
$HPO_4^{2-}$
MAP
DAP
V
+
-

500a
402
1. Electrodialysis
Switch E1 to E2
2. Nitrate Reduction
500b
NH4+
A-
C+
HO-
NO3-
NH3(aq)
406
402a
E1
502
408
404
404a
404b
410
406a
NO3-
NH3
(aq)
406b
= acidic
= basic
= anion exchange membrane
= cation exchange membrane
= influent water
3. Product Purification
Switch E3 to E1
Switch E2 to E3
C+
NH3
(aq)
NH3(aq)
402b
500c 600a
600b
$NH_3$ Recovery
$NH_4^+ + HO^- = NH_3 + H_2O$
1. Electrodialysis
$NH_4^+$
$A^-$
$NO_3^-$
$C^+$
$NH_4^+$
$HO^-$
$NH_{3(aq)}$
$E_1$
402a
402
408
404
404a
410
406
406a
602
$NH_3$ Synthesis
$NO_3^- + 9H^+ + 8E^- \rightarrow NH_3 + 3H_2O$
2. Nitrate Reduction
$NO_3^-$
$A^-$
$NH_3$ (aq)
$E_2$
402
606
604
408
404
410
406
Switch $E_1$ to $E_2$
Dynamic Bias
Switch $E_2$ to $E_1$
= anion exchange membrane
= anion exchange membrane
= influent water
= acidic
= basic

[Total Ammonia] (ppm)
Time (hr)
Cycle 1
Cycle 2
Cycle 3
Cycle 4

[Nitrate] (ppm)
Time (hr)
Cycle 1
Cycle 2
Cycle 3
Cycle 4

Left Chamber
Middle Chamber
Right Chamber
Total

[Chloride] (ppm)
Time (hr)
Cycle 1
Cycle 2
Cycle 3
Cycle 4 pH
Time (hr)
Cycle 1
Cycle 2
Cycle 3
Cycle 4

FIG. 13

806a-2
OER
806a-1
HER
406
410
804a
+
404
408
A⁻
NO$_3^-$
NH$_3$
-
802a-2
-1.0v vs SHE
402
OER
802a-1

AEM
CEM
1.0
0.5
0.0
$k_i/k_1$
Stage 1
-2.3
Stage 2
-1.0
Stage 3
-0.5
E (V vs. SHE)

| Wastewater | Typical Installation Flow ($m^3$/d) | [Nitrate] (mg N/L) | [Ammonia] (mg N/L) | Ammonia produced (kg N/d) |
|---|---|---|---|---|
| Municipal | 38,400 | 10 | 50 | 2,304 |
| Ion Exchange Brine | 260 | 1,000 | 0 | 260 |
| Reverse Osmosis Concentrate/Retentate | 68,813 | 50 | 11 | 4,198 |
| Anaerobic Digester Effluent | 430 | 5.9 | 500 | 218 |
| Nuclear Wastewater | 590 | 100,000 | 0 | 59,000 |
| Haber-Bosch Plant | - | - | - | 330,000 |

*FIG. 16*

APPARATUS AND METHODS FOR NITROGEN REDUCTION IN WASTEWATER

CROSS-REFERENCE TO RELATED APPLICATIONS

The current application is a national stage of PCT Application No. PCT/US2021/046015 filed Aug. 13, 2021, which claims the benefit of U.S. Provisional Patent Application No. 63/066,291 filed Aug. 16, 2020, the disclosures of which are hereby incorporated by reference in their entireties for all purposes.

FIELD OF THE INVENTION

The present invention generally relates to apparatuses and systems for reducing and/or recovering nitrogen and/or nitrogen containing compounds in wastewater.

BACKGROUND OF THE INVENTION

The nitrogen cycle is in urgent need of reinvention. Nitrogen (N) pollution is so widespread that the U.S. Environmental Protection Agency considers it one of the costliest, most difficult environmental problems we face in the 21st century. Haber-Bosch (HB) fertilizer production has outpaced removal of N from wastewater, leading to continuous losses from the nitrogen economy. These losses threaten aquatic ecosystems and human health by inducing harmful algal blooms that have increased exponentially since the 1960s, affect over 70% of U.S. freshwater, and cost over $2.2 billion/yr to remediate.2,3 Most engineering efforts to balance the N cycle focus on either (1) reducing the environmental impacts (energy, CO2 emissions) of HB using ambient conditions and novel catalysts or (2) expanding removal of N from wastewater as innocuous dinitrogen ($N_2$). However, these improvements may not significantly reduce N emissions and their negative cascade effects, may not address the energy, emissions, and costs of using N2 as an intermediate, and may not address legacy pollution (~30-year lifetime in Gulf of Mexico). Rather, new technologies and processes that recycle reactive nitrogen (e.g., ammonia, $NH_3$; nitrate, $NO_3^-$) may be beneficial, particularly those that can operate in a distributed fashion.

Reactive nitrogen in wastewater predominantly occurs as total ammonia ($NH_3/NH_4^+$) and nitrate ($NO_3^-$). Both forms contribute to algal blooms that overconsume $O_2$ (e.g., eutrophication) and produce cyanotoxins, disrupting aquatic ecosystems and threatening public health. Eutrophication affects 70% of U.S. surface waters and costs $2.2 billion/year. These effects have led to discharge limits for $NO_3^-$ and $NH_4^+$, and unit processes to convert them to dinitrogen gas ($N_2$). $NH_4^+$ is removed via stripping or via oxidation to $NO_3^-$ (e.g. nitrification), which is reduced to $N_2$ (e.g. denitrification). Biological nitrification-denitrification effectively removes nitrogen, but may use substantial aeration energy (e.g. 50% of treatment energy), chemical inputs (e.g., methanol), and areal footprints (for nitrifiers).

Resource recovery, or extracting value-added products from wastewaters, can reduce energy and costs of wastewater treatment. Several techniques (e.g., nitrification-distillation, struvite precipitation, cation exchange) can recover nitrogen, rather than just remove it as $N_2$ from ammonia-rich wastewaters (e.g., urine, landfill leachate, swine manure). Electrochemical systems, including microbial fuel cells, electrodialysis, and capacitive deionization, show particular promise because they use electricity to replace energy-intensive chemical inputs.

BRIEF SUMMARY OF THE INVENTION

Various embodiments are directed to an apparatus for nitrogen reduction of wastewater including: a first chamber including a salt solution and a first electrode; a second chamber including a wastewater source and a second electrode; a third chamber including a salt solution and a third electrode, where the second chamber is positioned between the first chamber and the third chamber; an anion exchange membrane positioned between the first chamber and the second chamber; and a cation exchange membrane positioned between the second chamber and the third chamber, where the first electrode is electrically connected to a first switch, the second electrode is electrically connected to a second switch, and the third electrode is electrically connected to a third switch, where each of the first switch, the second switch, and the third switch are electrically connected to a voltage source, and where any two of the first switch, the second switch, or the third switch are configured to engage to create a potential bias between their corresponding chambers.

In various other embodiments, the apparatus further includes an $NO_3RR$ electrode positioned in the first chamber.

In still various other embodiments, the $NO_3RR$ electrode and the first electrode are each configured to apply a potential bias to the first chamber.

In still various other embodiments, the $NO_3RR$ electrode and the first electrode are spaced apart from each other.

In still various other embodiments, the apparatus further includes a HER electrode positioned in the third chamber.

In still various other embodiments, the HER electrode and the third electrode are each configured to apply a potential bias to the third chamber.

In still various other embodiments, the HER electrode and the third electrode are spaced apparat from each other.

In still various other embodiments, the first switch, the second switch, and third switch are electrically connected to a voltage source.

In still various other embodiments, the voltage source is reversable.

In still various other embodiments, the first electrode and/or the second electrode includes a metal oxide mesh material.

In still various other embodiments, the metal oxide mesh material includes $TiO_2$, $IrO_2$ and/or $Ta_2O_5$.

In still various other embodiments, the third electrode comprises stainless steel.

Further, various embodiments are directed to a method of nitrogen reduction of wastewater, the method including: providing an apparatus including: a first chamber including a salt solution; a second chamber including a wastewater source; a third chamber including a salt solution and a third electrode, where the second chamber is positioned between the first chamber and the third chamber; an anion exchange membrane positioned between the first chamber and the second chamber; and a cation exchange membrane positioned between the second chamber and the third chamber; applying a potential bias between any two of the first chamber, the second chamber, and the third chamber.

In various other embodiments, the method further includes performing electrodialysis by applying an ionizing potential bias with a negative polarity to the third chamber and a positive polarity to the first chamber.

In still various other embodiments, the method further includes performing nitrate reduction by applying an ionizing potential bias with a negative polarity to the first chamber and a positive polarity to the second chamber.

In still various other embodiments, the method further includes performing product purification by applying an ionizing potential bias with a negative polarity to the second chamber and a positive polarity to the third chamber.

In still various other embodiments, the method further includes performing disinfectant production by applying an ionizing potential bias with a negative polarity to the third chamber and a positive polarity to the second chamber.

In still various other embodiments, the method further includes performing anion migration by applying an ionizing potential bias with a negative polarity to the second chamber and a positive polarity to the first chamber.

In still various other embodiments, the method further includes performing nitrate reduction by applying an ionizing potential bias with a negative polarity to the first chamber and a positive polarity to the second chamber.

In still various other embodiments, the method further includes performing fertilizer production by applying an ionizing potential bias with a negative polarity to the second chamber and a positive polarity to the first chamber.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures, which are presented as exemplary embodiments of the invention and should not be construed as a complete recitation of the scope of the invention, wherein:

FIG. 13 illustrates a diagram of an ENDR device in $NO_3$RR (Stage 2) with dual electrodes in left/right chambers accordance with an embodiment of the invention.

FIG. 16 illustrates a table summarizing estimates of $NH_3$ production from various wastewaters via EDNR according to embodiments compared to HB, where the estimated "typical" installation flow rates, and concentrations of $NO_3^-$ and $NH_4^+$ are provided.

DETAILED DESCRIPTION OF THE INVENTION

Figure 1:
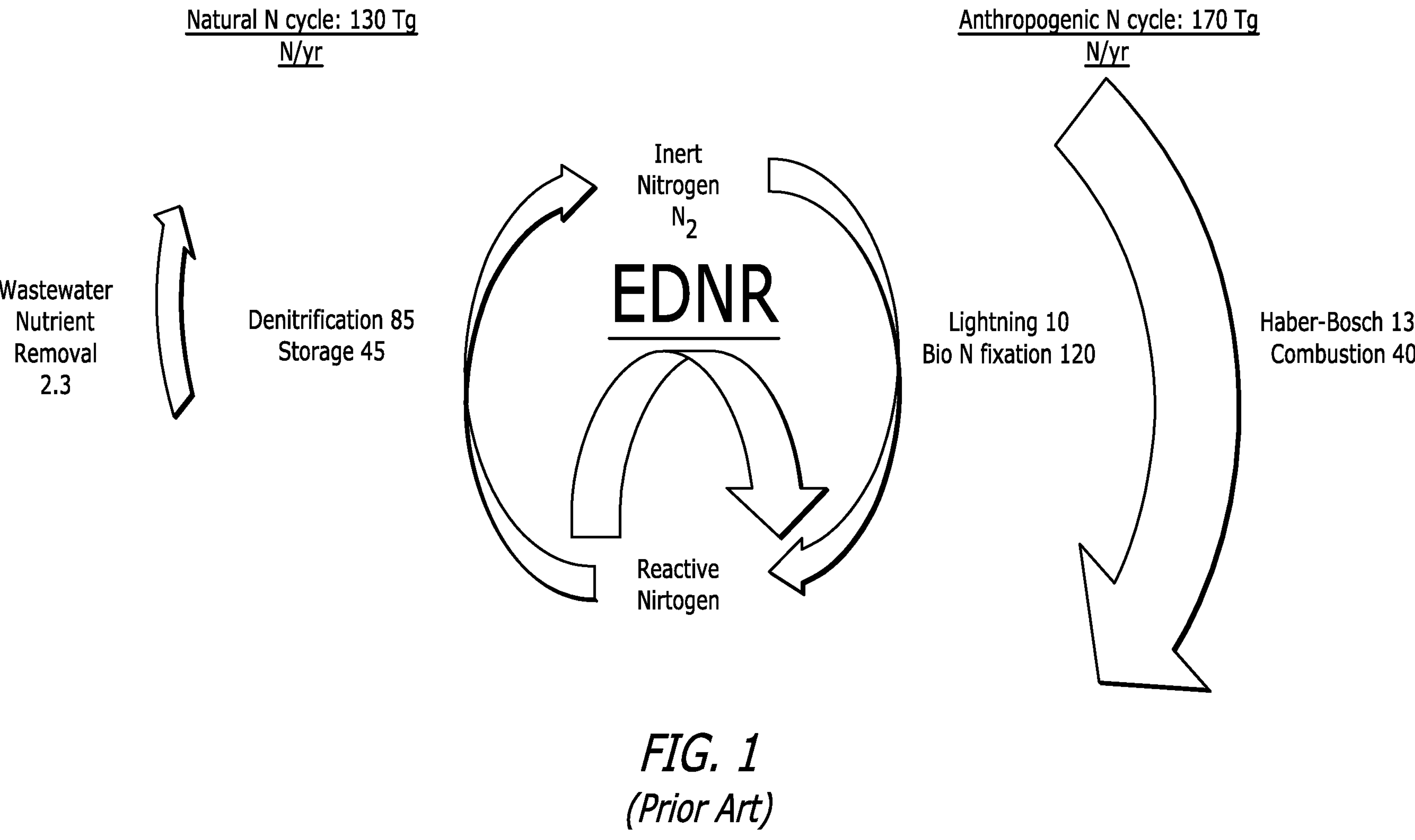
FIG. 1 provides a diagram of the anthropogenic effects on nitrogen cycle and role of EFRI in accordance with the prior art.

Various embodiments of the invention relate to reactive-separation processes whereby fugitive nitrogen emissions in wastewaters are transformed to target products and selectively isolated for recovery. In some embodiments, electricity-driven processes may be used because renewables are rapidly populating the energy grid and can be aligned with geographically distributed or isolated operations.

Turning to the drawings and disclosure, molecularly designed selective electrocatalysts, electrolytes, and separation reactors to enable automated, distributed ammonia manufacturing with minimal environmental impacts are provided. Many embodiments provide systems and methods for synthesizing and recovering ammonia from nitrogen-polluted wastewaters by leveraging two reactions during reactive electrochemical separations:

Ammonia Synthesis via Electrochemical Nitrate Reduction:

$$NO_{3^-} + 9H^+ + 8e^- \rightarrow NH_3 + 3H_2O$$

Ammonia Recovery via Electrodialysis and Electrochemical Swings:

$$NH_{4^+} \longleftrightarrow NH_3 + H^+.$$

Many embodiments implement Electrodialysis and Nitrate Reduction (EDNR), which accelerates ECS by avoiding $NH_3$ volatilization. EDNR consists of 3 steps: (1) electrodialysis to separate $NO_3^-$ and $NH_4^+$; (2) electrocatalytic reduction of $NO_3^-$ to $NH_3$; and (3) product purification by migrating other ions. Various embodiments implement a cycle in which an electrochemical cell, is divided into three chambers and three-electrodes, switches polarities between pairs of electrodes to allow both electrodialysis and nitrate reduction to occur. This creates a novel process that recovers a portfolio of chemical products, an ability that recovery techniques have not yet demonstrated. In many embodiments electrochemical stripping (ECS) is implemented which converts up to 94% nitrogen in human urine to fertilizer, while in other analytical experiments selective separations have been demonstrated for products such as hydrochloric acid and sodium hydroxide. A water immersible ammonia sensor based on the ECS process is also contemplated. The sensor can be integrated with Internet of Things platforms and with further development shows promise for automating ECS and EDNR. EDNR may include a combination of electrodialysis and nitrate reduction. In the former process, electricity is applied to electrodes to move aqueous salts through ion exchange membranes. In the latter process, aqueous nitrates are electrochemically reduced at a negative electrode to form nitrogen gas and aqueous ammonia.

Realizing EDNR requires investigating the electrocatalytic nitrate reduction reaction ($NO_3RR$), which can both denitrify (produce $N_2$) and fix nitrogen (produce $NH_3$). Most efforts focus on denitrification for N removal, and view $NH_3$ as an undesirable byproduct; intentional production and selective separation of $NH_3$ from $NO_3^-$ has been underexplored. Selective reduction to $NH_3$ presents several challenges: a thermodynamic reduction potential close to other products (e.g., $NO_2^-$, $N_2H_4$) and kinetic challenges of transferring eight electrons and adsorbing an anion to a negative cathode. Because pure metal electrocatalysts lack sufficient activity and selectivity, recent efforts focus on alloys (e.g., Pd or Pt with Cu or Sn). By analogy to $CO_2$ reduction, the electrolyte may play a major role in determining selectivity, activity, and stability. Understanding electrolyte effects is vital in wastewaters with complex, uncontrolled composition. There is a demonstrated need to identify the relative roles of electrolyte and electrode on $NO_3RR$, and to integrate ammonia synthesis with ammonia recovery from wastewaters. Wastewater may include reverse osmosis brine, secondary effluent, municipal wastewater, and fertilizer runoff.

FIG. 1 is a diagram of the anthropogenic effects on the nitrogen cycle and role of EFRI in accordance with the prior art. Humans have altered the global nitrogen (N) cycle, asymmetrically doubling its throughput due to industrial Haber-Bosch fertilizer production (HB). Fertilizer runoff and inadequate wastewater removal may increase waterborne emissions of reactive nitrogen (e.g., $NH_4^+$, $NO_3^-$) that induce harmful algal blooms (cyanotoxins, methemoglobinemia). Both water purification and ammonia ($NH_3$) synthesis occur in centralized facilities which may have severe limitations: only 20% of wastewater is collected at treatment plants, and HB ammonia synthesis may require high temperature (400° C.), pressure (200 atm), energy input (1.2% of global energy), and greenhouse gas (GHG) emissions (5% of industrial $CO_2$). Selective electrochemical separations and electrocatalysis may reduce N pollution and produce $NH_3$ from wastewaters. Reimagining aqueous N pollutants as products can reduce energy, chemical inputs, costs, and emissions of $NH_3$ production and water treatment. Distributed electrochemical manufacturing may re-engineer the nitrogen cycle, a major 21$^{st}$ century challenge critical to a sustainable food-energy-water ecosystem: feeding a growing population while minimizing environmental impacts.

Decentralized wastewater systems (e.g., septic tanks, pit latrines) are used by the majority of people in developing regions and by 25% of the U.S. population. Similarly, distributed chemical manufacturing can reduce GHG emissions, transport, and costs. Using these metrics, several studies have developed methods to identify optimal degrees of decentralization for water treatment and chemical manufacturing. A major obstacle facing distributed chemical manufacturing and water treatment is limited process control capable of handling extreme variability, operation failures, and maintenance. Electrochemical systems can facilitate distributed operation because electricity is the primary input and operating parameter. Real-time water sensing can inform process control for optimal treatment performance. There may be a need for predictive, adaptive process control for distributed chemical manufacturing and water treatment.

Figure 2:
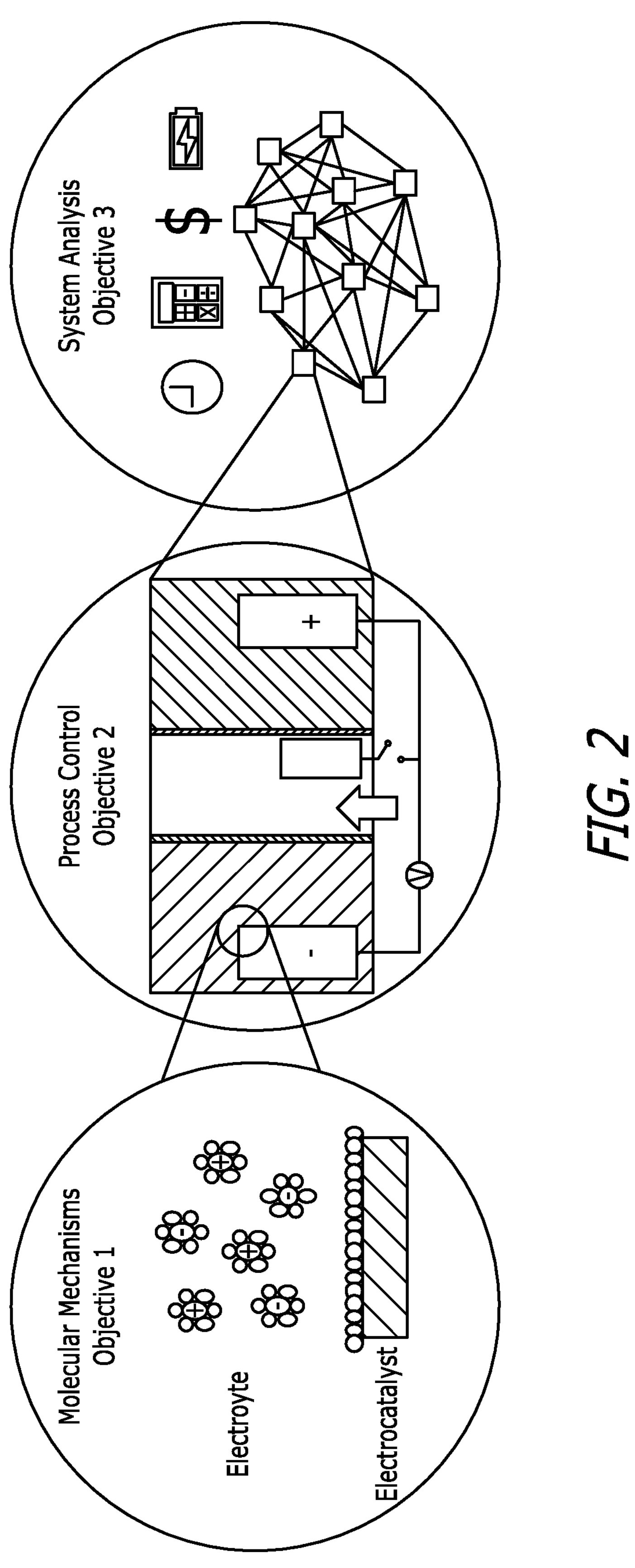
FIG. 2 provides a schematic of a method for re-engineering the nitrogen cycle to produce wastewater-derived NH3, in accordance with an embodiment of the invention.

FIG. 2 is a schematic of a method for re-engineering the nitrogen cycle to produce wastewater-derived NH3, in accordance with an embodiment of the invention. Various embodiments overcome a critical barrier to on-site manufacturing: inefficient coupling of water purification and $NH_3$ production. This barrier arises from historically separate development of extract-and-emit chemical manufacturing appended with end-of-pipe pollution abatement. Various embodiments overcome this barrier by reimagining wastewaters as modern mines for raw materials, which can reduce inputs and emissions while advancing a circular N economy. Such embodiments implement such solutions by characterizing wastewater electrolytes that inform the design of electrocatalysts and reactive electrodialysis and nitrate reduction (EDNR) devices; identify operating parameters that optimize ammonia production through data-driven process control; and prioritize regional settings based on local wastewater supply and ammonia demand.

EDNR may benefit from investigating the electrocatalytic nitrate reduction reaction ($NO_3RR$), which can both denitrify (produce $N_2$) and fix nitrogen (produce $NH_3$). Most efforts focus on denitrification for N removal, and view $NH_3$ as an undesirable byproduct; intentional production and selective separation of $NH_3$ from $NO_3^-$ has been underexplored. Selective reduction to $NH_3$presents several challenges: a thermodynamic reduction potential close to other products (e.g., $NO_2^-$, $N_2H_4$) and kinetic challenges of transferring eight electrons and adsorbing an anion to a negative cathode. Pure metal electrocatalysts may lack sufficient activity and selectivity, thus recent efforts focus on alloys (e.g., Pd or Pt with Cu or Sn). By analogy to CO2reduction, the electrolyte may play a major role in determining selectivity, activity, and stability. Understanding electrolyte effects is vital in wastewaters with complex, uncontrolled composition. It may be beneficial to identify the relative roles of electrolyte and electrode on NO3RR, and to integrate ammonia synthesis with ammonia recovery from wastewaters.

Embodiments accomplish these synergistic objectives by integrating molecular engineering of electrocatalysts, electrolytes, and devices with machine learning models for predictive, field-ready process control and identifying optimal regions using remote sensing. Embodiments are relevant to several fields: mechanistic understanding of ambient electrochemical $NH_3$ synthesis (electrocatalysis, separations), predicting and controlling electrochemical N recovery from real wastewaters (data science, process control), and evaluating an expanded product portfolio for chemical production from wastewaters (economics, multi-scale modeling).

Embodiments implement technologies including adsorptive and electrochemical reactive separations to recover ammonia from urine, anaerobic digestate, and algae; electrochemical stripping (ECS), a process that uses electrochemical swings to recover >93% of NH3based on charge and volatility; and water electrolysis that facilitates $NH_4^+$ migration across a cation exchange membrane from anode (oxygen evolution reaction, OER) to cathode (hydrogen evolution reaction, HER), where the pH rises and $NH_3$ volatilizes (rate-limiting step) such that volatile $NH_3$ migrates across a gas permeable membrane to form $(NH_4)_2SO_4$ upon contact with $H_2SO_4$.

Embodiments Implementing Three-Chambered Electrochemical Cells

Figure 3:
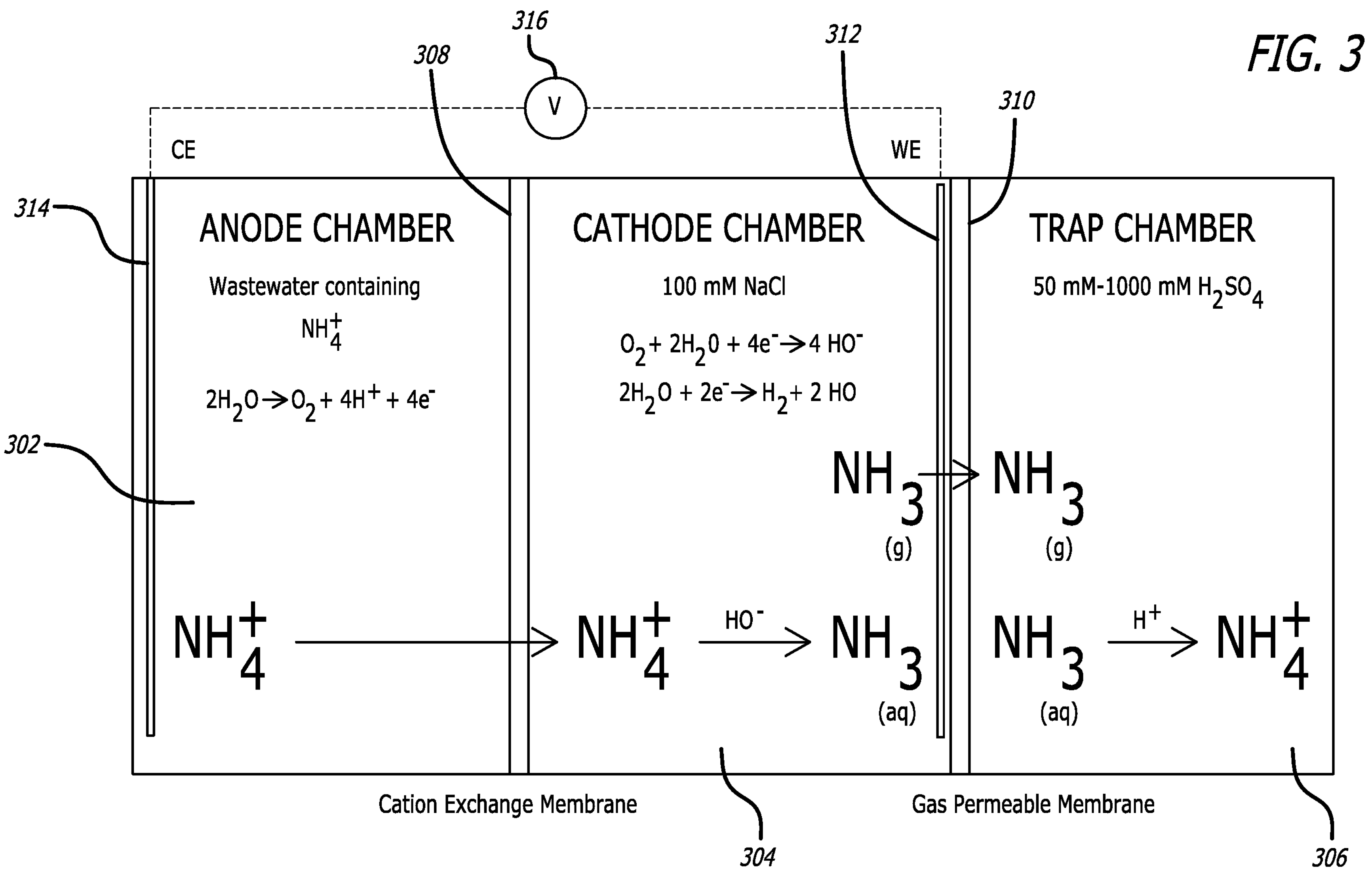
FIG. 3 provides a schematic of a previous implementation of a three chamber cell for conducting EDNR.

Turning now to the drawings, FIG. 3 illustrates a schematic of a previous implementation of a three chamber cell for conducting EDNR. The three chamber cell includes an anode chamber 302, a cathode chamber 304, and a trap chamber 306. The cathode chamber 304 is positioned in between the anode chamber 302 and the trap chamber 306. A cation exchange membrane 308 is positioned between the anode chamber 302 and the cathode chamber 304. A gas permeable membrane 310 is positioned between the cathode chamber 304 and the trap chamber 306. A working electrode (WE) 312 is immersed in the cathode chamber 304. The working electrode 312 may act as a cathode and may be made out of stainless steel. A common electrode (CE) 314 may be immersed in the anode chamber 302. The common electrode 314 may function as an anode and may be made out of a titanium mesh coated with iridium mixed metal oxide. The wastewater may be placed in the anode chamber 302. The wastewater may contain $NH_4^+$. A salt solution may be placed in the cathode chamber 304. The salt solution may be 100 mM of NaCl. An acid solution may be placed in the trap chamber 306. The acid solution may be 50 mM-1000 mM $H_2SO_4$.

The ECS process may move nitrogen from left to right. Wastewater may be placed in the anode chamber 302. A potential may be applied between the common electrode 314 and the working electrode 312. The potential may be a voltage source 316. Influent ammonium may move from the anode chamber 302 to cathode chamber 304 under influence of a concentration gradient and applied potential. In the cathode chamber 304, ammonium may react with electrochemically produced hydroxide ions to yield aqueous ammonia, which then partitions to the gas phase and diffuses through the gas permeable membrane 310 into the trap chamber 306. The acidic trap environment then converts ammonia back to ammonium.

Figure 4:
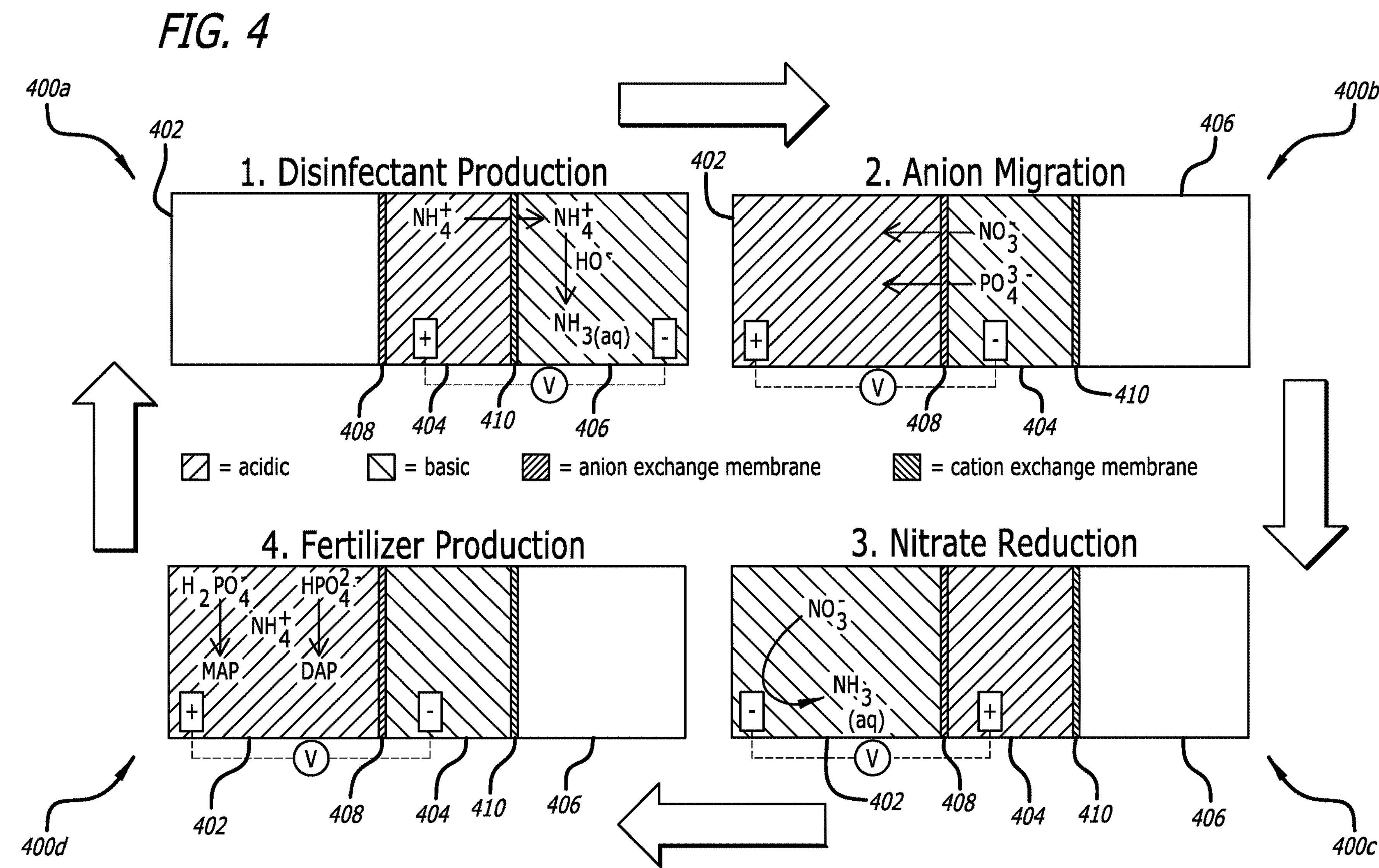
FIG. 4 provides a schematic of an exemplary embodiment of the operation of an apparatus performing electrodialysis and nitrogen reduction (EDNR) in accordance with an embodiment of the invention.

FIG. 4 illustrates an EDNR process, which employs a three-chambered electrochemical cell similar to the three-chamber electrochemical cell of FIG. 3 in accordance with an embodiment of the invention. However, there are several key differences between EDNR and ECS illustrated in FIG. 3. First, the cell in EDNR may not possess a gas permeable membrane 310, which may be the rate limiting and energetically inefficient component of ECS. Second, the cell may cycle through four different stages throughout the recovery process, as opposed to a static single stage process as in ECS illustrated in FIG. 3. These differences may allow EDNR to recover a portfolio of products as opposed to the single fertilizer in ECS. In particular, EDNR may selectively separate alkaline ammonia and the fertilizers monoammonium phosphate (MAP) and diammonium phosphate (DAP), which together exceed 50% of the total fertilizer market. Alkaline ammonia can be used as a disinfectant or produce ammonia gas, a coolant.

FIG. 4 illustrates cycle of stages each electrode assumes throughout the wastewater recovery process. The three-chambered electrochemical cell includes a first chamber 402, a second chamber 404, and a third chamber 406. The second chamber 404 may be positioned between the first chamber 402 and the third chamber 406. There may be an anion exchange membrane 408 which divides the first chamber 402 and the second chamber 404. There may be a cation exchange membrane 410 which divides the second chamber 404 and the third chamber 406. Wastewater may be fed into the second chamber 404. In FIG. 4, when a chamber is blank, the electrode in that chamber has no applied potential. A (+) electrode corresponds to the anode and (−) to the cathode (e.g. all modes of operation are electrolytic). In chambers with a (+) electrode, water splitting acidifies the chamber; in chambers with a (−) electrode, hydrogen evolution basifies the cham ber.

The purpose of switching electrode roles in the EDNR cycle is to accomplish recovery in stages. Stage 1 400*a* includes disinfectant production. In stage 1 400*a*, a potential is applied where the second chamber 404 acts as the anode and is acidic and the third chamber 406 acts as the cathode and is basic. The potential creates an electric field that may move ammonium ($NH_4$) from the acidic second chamber 404 across the cation exchange membrane 410 to a basic third chamber 406, where alkaline ammonia may be recovered.

Stage 2 400*b* includes anion migration. In stage 2 400*b*, a potential is applied where the first chamber 402 acts as the anode and is acidic and the second chamber 404 acts as the cathode and is basic. The potential may create an electric field that may move nitrate and phosphate across the anion exchange membrane 408 to the first chamber 402.

Stage 3 400*c* includes nitrate reduction. In stage 3 400*c*, the voltage is reversed to facilitate nitrate reduction. A potential is applied where the first chamber 402 acts as the cathode and is basic and the second chamber 404 acts as the anode and is acidic. This may transform the nitrate in the first chamber 402 into ammonia.

Stage 4 400*d* includes fertilizer production. In stage 4 400*d*, the voltage is once again reversed to acidify the first chamber 402. In this stage, monoammonium phosphate (MAP) and diammonium phosphate (DAP) may be produced. In some embodiments, high recovery rates may be achieved through optimizing the electrochemical cell one at a time.

In some embodiments, additional steps may be taken such as screening electrocatalyst performance towards hydrogen evolution reaction (HER), oxygen evolution reaction (OER), and nitrate reduction ($NO_3RR$). Each of the chamber may include a separately accessible electrode. In some embodiments, each electrode may include electrocatalysts which may enable EDNR. The left electrode in the first chamber 402 may include an electrocatalyst that promotes $NO_3RR$, the middle electrode in the second chamber 404 may include an electrocatalyst that promotes the HER and OER while being inert to nitrate, and the right electrode in the third chamber 406 may only perform the HER. Using chronoamperometry paired with ion chromatography, reaction rates and faradaic efficiencies of the HER, OER, and NR may be calculated across various electrocatalysts. Materials used for NR may include tin, bismuth, and copper. Stainless steel and iridium oxide may provide activity and selectivity for the HER and OER, respectively.

Ion exchange membrane fouling may occur as a result of the accumulation of feedwater constituents at the membrane surface, imparting a larger electrical resistance and thereby decreasing permselectivity and ionic flux. Anti-fouling techniques may be performed to assure this phenomena does not occur on the ion exchange membranes. In situ characterization techniques coupled with ex situ measurements, the formation, nucleation, and subsequent growth of foulants on membrane surfaces using small and wide angle X-ray scattering to probe chemical formation may provide beneficial information related to fouling. By systematically relating the observed foulant chemistry and morphology to membrane performance in our electrochemical cell (measured by ion chromatography), which intermolecular interactions of wastewater components with ion-exchange membranes hinder their performance may be determined. Detailed and predictive guidelines may then be created to inform anti-fouling strategies, thus increasing lifetime and reliability.

Operating conditions may influence nitrogen recovery rate. With a set of high performing components as illustrated in FIG. 4, recovery data may be obtained as a function of various parameters including operation time, current, and voltage. The measurements may be from a combination of potentiometry and ion chromatography. Recovery vs. time and energy (voltage, current) tradeoffs may be evaluated, and all collected data may go towards optimizing nitrogen recovery rate.

It may be advantageous to interrogate electrochemical performance under simulated ISS conditions. In one example, the ISS was selected as a model system in which to interrogate the cell, as opposed to the moon or Mars, because (1) microgravity may be a more extreme gravitational environment to operate under than the moon or Mars and (2) water recovery systems may be interconnected, making design with respect to existing systems on the ISS more pragmatic than conceptual ones for extraterrestrial lands. Thus, while EDNR may play a crucial role for resource recovery on the moon and Mars, its development on spacecraft was prioritized before moving forward with moon and Mars designs.

It may be advantageous to investigate effects of microgravity on gas evolution from electrode surfaces. Phenomena which may be affected by low gravity environments include surface interfacial tension and multiphase system dynamics. Hydrogen, oxygen, and nitrogen gas evolved from electrochemical reactions may form bubbles on electrode surfaces. In space, there is no buoyant force, and thus the bubbles may stick and grow on the electrode surface as they do on the surface of heaters. This may block the electrolyte from contacting the electrode, creating unreactive surface area and inhibiting electrochemical reaction. In some embodiments, the electrochemical cells may operate using peristaltic pumps for recirculation. Though they offer a mechanism to pop the bubbles, positive displacement pumps currently used on the ISS may malfunction due to their large number of moving parts. The growth of these bubbles and methods to break them may be accomplished without using recirculation, such as stirring the electrolyte or rotating the cell. Nitrogen gas evolution may also be performed including HER and OER. Experiments can be done on a reduced-gravity aircraft and potentially at zero gravity research facilities at NASA (e.g., Glenn).

It may be advantageous to identify and mitigate undesirable (electrochemical) side reactions by testing the cell with wastewater compositions paralleling those on the ISS. Side reactions may be determined by using influents representative of wastewater found in space. Ions and their concentrations may be found in NASA studies and formulations such as the Early Planetary Base Wastewater Ersatz. The ISRU Lab at Kennedy or Advanced Life Support R&D at Ames are also potential resources to leverage in making realistic synthetic wastewater. Through cyclic voltam metry, ion chromatography, and gas chromatography, rate of side reactions may be identified and quantified. The characterization may allow the formulation of mitigation strategies that maintain safe and stable operation. For example, chloride ions can oxidize to form toxic chlorine gas. However, in human urine, chlorine gas reacts with water to form hypochlorous acid, a less harmful, weak acid.

The electrochemical cell can be remotely controlled by wireless networks because electricity may be the major input, allowing the voltage switching in EDNR. The timing of the switching frequency may be informed by an in-situ pH sensor to track the development of the HER and OER, which basify and acidify the reaction chambers to produce disinfectant and fertilizers, respectively.

It may be advantageous to maximize energy efficiency as a figure of merit (FoM). A FoM may be a practical and efficient method to characterize and compare the performance of a technology, with criteria that the FoM be definable, measurable, useful, and primary (as opposed to derivative). In some embodiments, the FoM may be defined in the electrochemical cell by: FoM={mass of recovered product/energy input}.

It may be advantageous to use a mathematical model describing mass transport of species in the system and validate against experimental data. The mass of ammonia/ammonium, nitrate, and phosphate may be described over time by solving a system of differential equations for the time-dependent concentrations of each species. Ammonia/ammonium and phosphate may not react at electrodes and any bulk reactions (e.g., protonation) may occur on very fast timescales. Thus, their mass transfer may be tracked across membranes through mass transfer coefficients, which can be solved from first principles (e.g., Maxwell-Stefan) or phenomenologically fit. Nitrate undergoes electrochemical reduction in addition to mass transfer. Butler-Volmer kinetics and Marcus theory provide a starting point for fitting chronoamperometric data to a single or couple of parameters. By determining these mass transfer and kinetic parameters for a spectrum of experimental operating times, voltages, and currents, empirical relations may be generated describing the mass transfer and kinetic parameters.

The model may be used to predict a wide spectrum of operating conditions and their effects on the FoM. Mass transfer and kinetic parameter values may be interpolated to simulate recovery experiments. The model fitting may produce equations for mass transfer and kinetic parameters as a function of time between 1 and 10 hours, voltages between 2 and 3 volts, and currents between 0.1 and 1 amp. Simulations may be run for experimental conditions not exhaustively tested in lab (e.g., 2 hours, 2.2 volts, and 0.8 amps) and from the results, calculate a FoM. Thus, this allows for the screening of a much larger range of experimental conditions than could be physically performed. The most promising conditions can be tested in the laboratory for verification.

Embodiments Implementing EDNR

Figure 5:
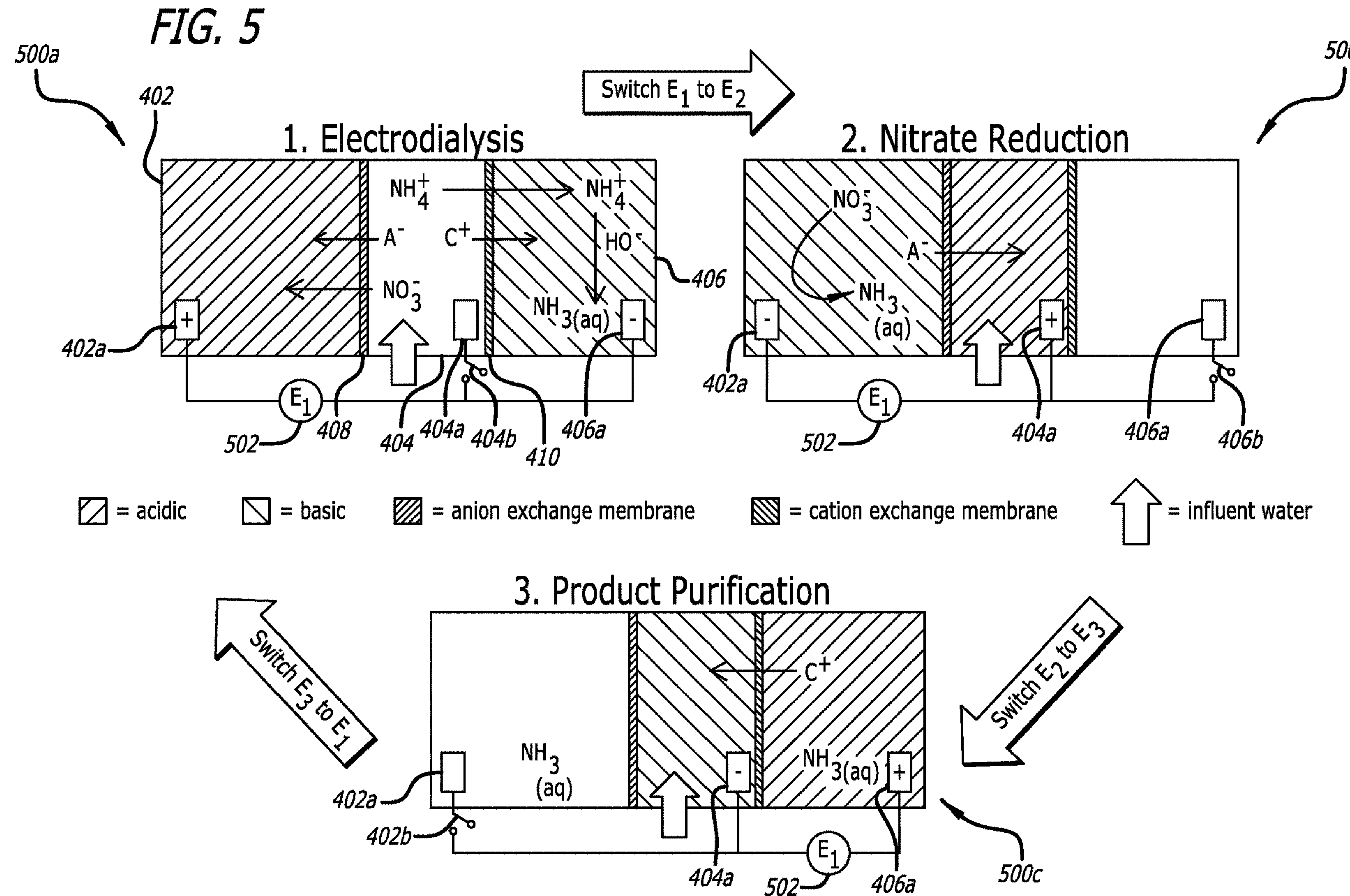
FIG. 5 provides a schematic of electrodialysis and nitrate reduction (EDNR), with 3-stage cycle where electrodes switch bias ($E_1$, $E_2$, $E_3$), in accordance with an embodiment of the invention.

FIG. 5 illustrates a schematic of a system for electrodialysis and nitrate reduction (EDNR), with 3-stage cycle where electrodes switch bias ($E_1$, $E_2$, $E_3$). The three chamber design shared identically labeled features as FIG. 4 and these features will not be repeated. Wastewater may be fed into the second chamber 404. When a chamber is blank, no potential is applied to that electrode. (+) electrodes are anodes acidified by $O_2$ evolution (OER); (−) electrodes are cathodes basified by $H_2$ evolution (HER).

EDNR may use bias switching to extract nitrate and ammonia from wastewaters. First, Ammonia Synthesis may occur via Electrochemical Nitrate Reduction:

$$NO_3^- + 9H^+ + 8e^- \rightarrow NH_3 + 3H_2O.$$

Second, Ammonia Recovery may occur via Electrodialysis and Electrochemical Swings: $NH_4^+ \leftrightarrow NH_3 + H^+$ The three chamber design of FIG. 5 includes electrodes connected to each chamber. The first chamber 402 may be connected to a first electrode 402*a*, the second chamber 404 may be connected to a second electrode 404*a*, and the third chamber 406 may be connected to a third electrode 406*a*. As illustrated, the first electrode 402*a*, the second electrode 404*a*, and the third electrode 406*a* may be connected together. A first switch 402*b* may be connected to the first electrode 402*a*, a second switch 404*b* may be connected to the second electrode 404*a*, and a third switch 406*b* may be connected to the third electrode 406*a*. Each of the switches 402*b*, 404*b*, and/or 404*c* may disconnect its respective electrode 402*a*, 404*a*, and/or 406*a* from a voltage source 402. The voltage source may be connected to each of the electrodes 402*a*, 404*a*, and/or 406*a* and may be variable in order to change polarization between the electrodes 402*a*, 404*a*, and/or 406*a*

As discussed previously, FIG. 4 illustrates a sample operational concepts for a four cycle process. FIG. 5 illustrates a three stage process. It is noted that Stage 1 400*a* and Stage 2 400*b* of FIG. 4 relate to the combined single cycle described in connection with FIG. 5 as Stage 1 500*a*. Stage 1 500*a* may be applied to provide electrodialysis. In Stage 1 500*a*, the voltage source 402 may apply a positive voltage to the first electrode 402*a* and a negative voltage to the third electrode 406*a*. The second switch 404*b* may be operated to disconnect the second electrode 404*a* from the voltage source 502. Advantageously, the EDNR process depicted in FIG. 5 recovers nitrate and ammonia simultaneously in one process. Prior techniques merely recover one of nitrate or ammonia and not both simultaneously. The apparatus illustrated in FIG. 5 is also capable of bias switching to recover multiple products with a single apparatus. Further, the apparatus illustrated in FIG. 5 includes a catalyst design framework for oxygen evolution and nitrate reduction.

Stage 2 500*b* may be applied to produce nitrate reduction. Stage 2 500*b* roughly corresponds to Stage 3 400*c* of FIG. 4. In Stage 2 500*b*, the voltage source 502 applies a negative voltage to the first electrode 402*a* and a positive voltage to the second electrode 404*a*. The third switch 406*b* may be operated to disconnect the third electrode 406*a* from the voltage source 502.

Stage 3 500*c* may be applied to produce product purification. In Stage 3 500*c*, the voltage source 502 applies a positive voltage to the third electrode 406*a* and a negative voltage to the second electrode 404*a*. The first switch 402*b* may be operated to disconnect the first electrode 402*a* from the voltage source 502. After Stage 3 500*a*, Stage 1 500*a* may be repeated. It is understood that one of ordinary skill may apply Stage 4 400*d* of FIG. 4 in conjunction to and/or in substitute of Stage 3 500*c* of FIG. 5.

Electrodialysis and Nitrate Reduction (EDNR) may efficiently couple water purification and ammonia production from nitrogen-polluted wastewaters. EDNR may transform the industrial N cycle. In some embodiments, ambient ammonia synthesis from nitrate may be conducted through polluted waters. In some embodiments, synthesized ammonia may be captured and valorized. Synthesizing and recovering ammonia from nitrogen-polluted wastewaters may be performed by leveraging two reactions during reactive electrochemical separations:

1) Ammonia Synthesis via Electrochemical Nitrate Reduction:

$$NO_3^- + 9H^+ + 8e^- \rightarrow NH_3 + 3H_2O$$

2) Ammonia Recovery via Electrodialysis and Electrochemical Swings:

$$NH_4^+ \leftarrow \rightarrow NH_3 + H^+$$

In some embodiments, a dynamic bias may be applied to an electrochemical membrane reactor, e.g., the sign, magnitude, and location of applied voltages change in cyclical fashion to achieve simultaneous N removal and recovery. In addition, EDNR may facilitate tailoring of electrolyte compositions separate from influent (e.g., wastewater) composition due to the use of ion exchange membranes and dynamic bias. Thus, by leveraging catalysis and separations in one technology, some embodiments are able to apply EDNR to treat ubiquitous, growing wastewater feedstocks including municipal wastewater (teraliters/day production, 80% not treated before discharge.), fertilizer runoff (non-point source, majority of U.S. N emissions), reverse osmosis brine, and secondary effluent. EDNR may not constrained to one type of electrocatalytic material—rather, it may be a flexible platform in which the appropriate electrode may be chosen based on the target contaminants for removal. While this disclosure relates to the treatment of wastewater nitrates and ammonium, a portfolio of other chemical species may also be treated/recovered through the reactive-separation process of EDNR, including acetate, carbon dioxide, and hydrogen sulfide.

Figure 6:
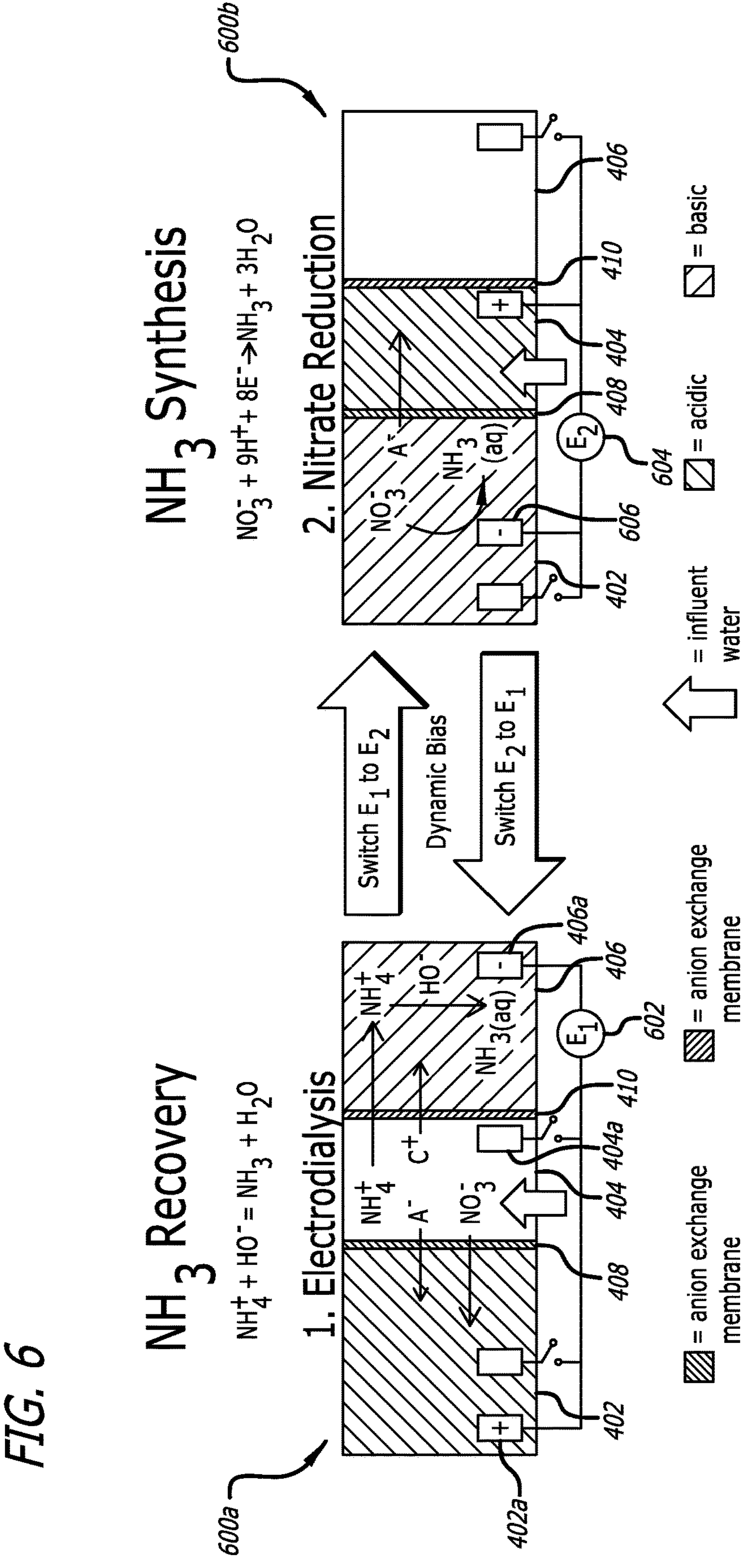
FIG. 6 illustrates a schematic for a system for electrodialysis and nitrate reduction (EDNR), with a 2-stage cycle where electrodes switch bias.

FIG. 6 illustrates a schematic for a system for electrodialysis and nitrate reduction (EDNR), with a 2-stage cycle where electrodes switch bias ($E_1$ and $E_2$). The three chamber design shared identically labeled features as FIGS. 4 and 5 and these features will not be repeated. Wastewater may enter the second chamber 404. When a chamber is blank, no potential is applied to its electrode. (+) denotes anodes acidified by $O_2$ evolution (OER); (−) denotes cathodes basified by $H_2$ evolution (HER). A first stage 600*a* may perform electrodialysis. The electrodialysis may accomplish $NH_3$recovery through the following equation:

$$NH_4^+ + HO^- \leftrightarrow NH_3 + H_2O$$

In a first stage 600*a*, the first electrode 402*a* may apply a positive potential to the first chamber 402 and the third electrode 406*a* may apply a negative potential to the third chamber 406. The first electrode 402*a* and the third electrode 406*a* may be connected to a first voltage source 602 which may be used to apply the potentials with proper polarization and quantity.

A second stage 600*b* may perform nitrate reduction. The nitrate reduction may be accomplish $NH_3$ synthesis through the following equation:

$$NO_3^- + 9H^+ + 8e^- \rightarrow NH_3 + 3H_2O$$

In a second stage 600*b*, a fourth electrode 606 may apply a negative potential to the first chamber 402 and the second electrode 404*a* may apply a positive potential to the second chamber 404. The fourth electrode 606 and the second electrode 404*a* may be connected to a second voltage source 604 which may be used to apply the potentials with proper polarization and quantity. As illustrated in FIGS. 5 and 6, the potential applied to the electrodes 402*a*, 404*a*, 406*a*, 606 may be controlled through switches attached to each electrode 402*a*, 404*a*, 406*a*, 606.

Embodiments Implementing Wastewater Electrolytes

Applying a dynamic electrochemical bias to a carefully engineered electrode assembly according to embodiments enables three key processes in wastewaters: 1) electrochemical nitrate reduction, 2) $NH_3$ recovery, and 3) purified (e.g., denitrified) water production. Electrolyte and electrode composition both play critical roles in determining the activity, selectivity, and stability of electrocatalytic systems, and the interplay between these factors is often complex and unpredictable. Thus, various embodiments may disaggregate the roles of electrolyte and electrode composition in determining key electrocatalytic metrics (stability, activity, selectivity). These molecular-level insights may be integrated in various embodiments to optimize EDNR operating parameters for maximizing ammonia production (synthesis+recovery) in functional devices.

Figure 7:
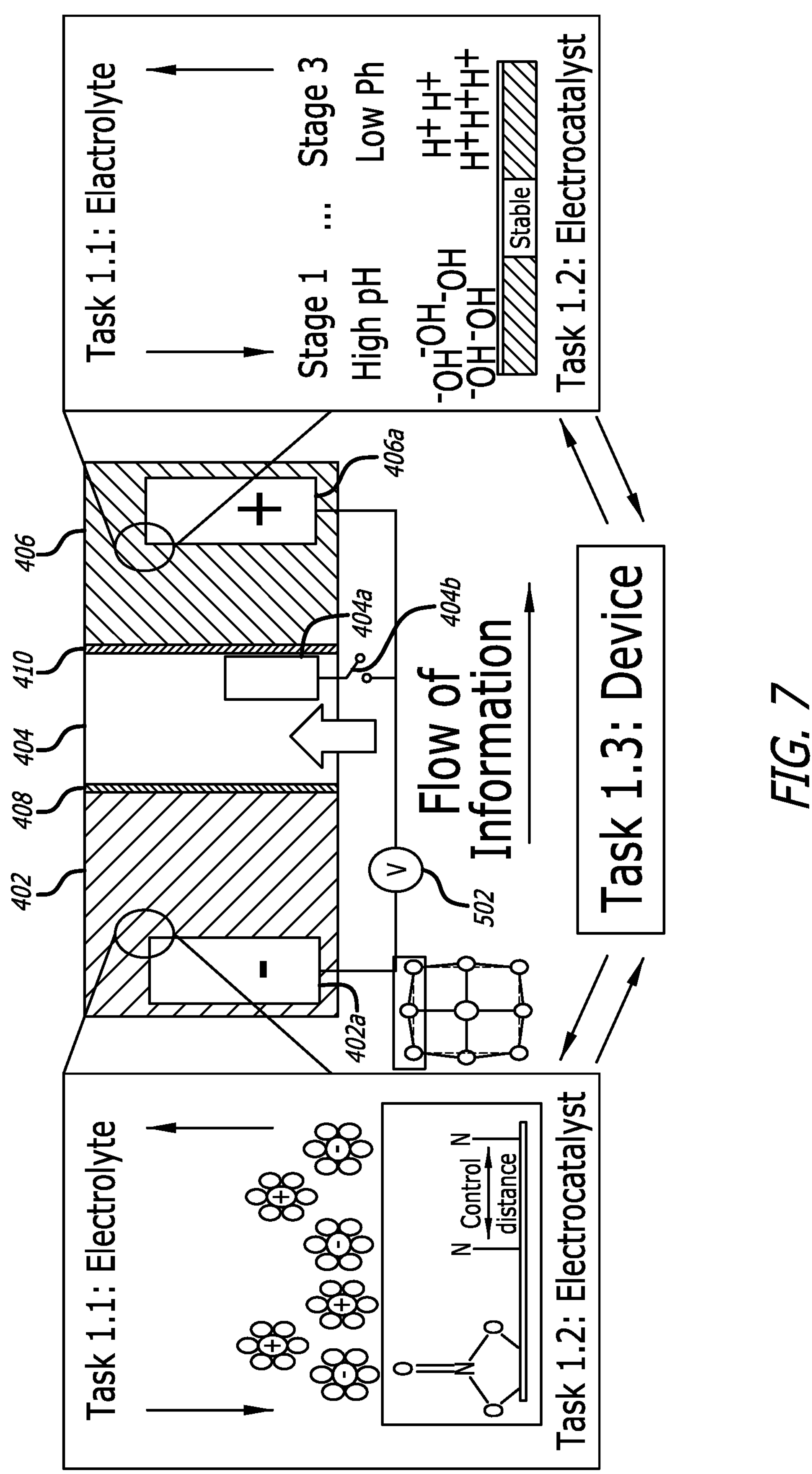
FIG. 7 provides a schematic of a system for investigating the role of electrolyte and electrocatalyst conducted in each chamber accordance with an embodiment of the invention.

FIG. 7 illustrates a schematic of a system for investigating the role of electrolyte and electrocatalyst conducted in each chamber according to an embodiment of the invention. The system of FIG. 7 shares many identically labeled features with the systems of FIGS. 4-6. In the first chamber 402, wastewater-relevant solvated ions (e.g., $K^+$, $Na^+$) may stabilize surface intermediates on the electrocatalyst surface, which is shown as an inset to the adjacent lattice that demonstrates leveraging expansive lattice strain to hinder $N_2$ formation and improve $NH_3$ selectivity during $NO_3RR$, and where in the third chamber 406, electrode materials of the third electrode 406*a* that are stable across a wide pH range are determined.

An embodiment of an EDNR device may use $Ti/IrO_2$-$Ta_2O_5$ mesh for the first electrode 402*a* and the second electrode 404*a* and stainless steel electrodes for the third electrode 406*a* (see FIGS. 4-7). In some embodiments, the recirculating batches of synthetic ion exchange brine ($NaNO_3/(NH_4)_2SO_4$ solution) with LiCl supporting electrolyte may be periodically sampled from each chamber, and ion chromatography may be used to quantify aqueous products and calculate $NH_3$ yield, purity, and selectivity. In some embodiments, using a solution of $NaNO_3/(NH_4)_2SO_4$, 99% of influent $NH_4^+$ has been recovered to the third chamber 406 whilc reducing 8.3% of initial $NO_3^-$ to $NH_3$ in the first chamber 402.

FIGS. 8*a* to 8*d* illustrate an aqueous composition during EDNR operation which correspond to Stage 1 400*a* and Stage 2 400*b* of FIG. 4. Solid vertical lines demarcate cycles; dotted lines demarcate stages within a cycle. The Total line is sum of all chambers. In FIG. 8(*a*), over 100 ppm ammonia was produced by cycle 4 (Faradaic efficiency >30%). In FIG. 8(*b*), total nitrate in the system decreased by 12%, indicating $NO_3RR$. In FIG. 8(*c*), total chloride varied no more than 3%. In FIG. 8(*d*), pH is basic in the first chamber 402 and acidic in the second chamber 404 and the third chamber 406. The second chamber 404 may be acidic because no buffering capacity is present. In some embodiments, natural buffer species such as $HCO_3^-$ may be present in the second chamber 404 making the middle pH ~7. The oscillating pH and ion concentrations may reflect the cyclical process and illustrate that by tuning the applied potential and duration of each stage, pH and ion concentrations can be tuned as well.

Figure 8A:
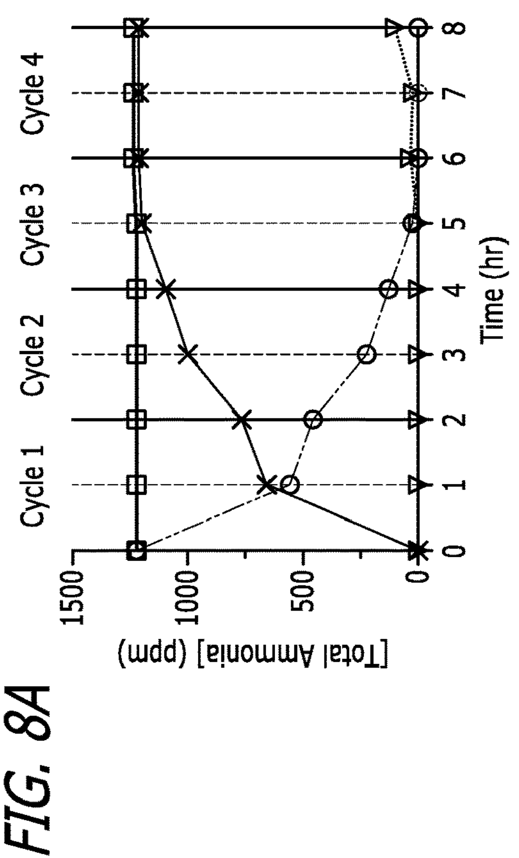
FIGS. 8*a* to 8*d* illustrate various charts illustrating total ammonia content within the chambers of the apparatus according to embodiments.
Figure 8B:
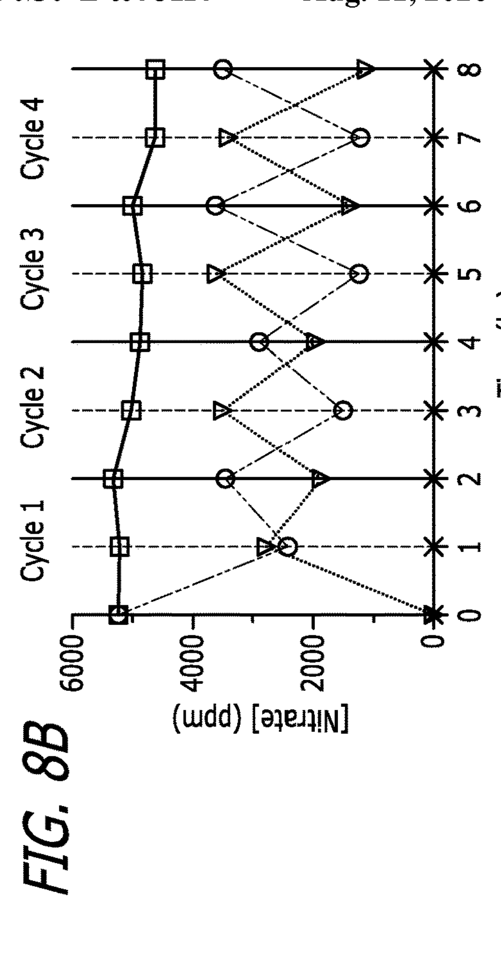
Figure 8C:
Figure 8C:
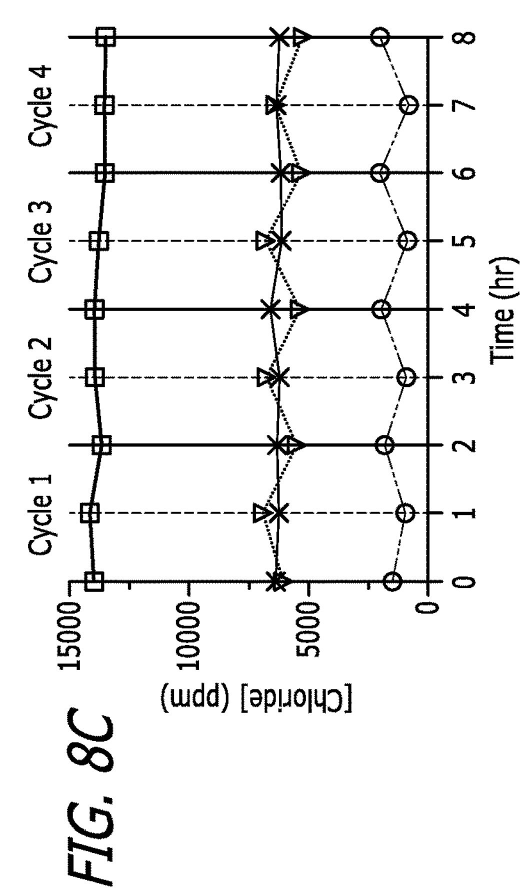
Figure 8D:
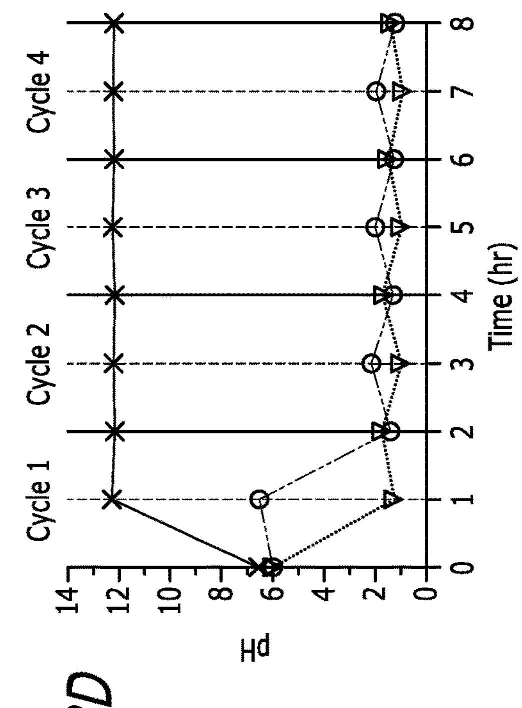

Over 99% of influent ammonium may recovered to the third chamber 406 (FIG. 8*a*). 12% of initial nitrate reacted (FIG. 8*b*) may reach a peak faradaic efficiency towards ammonia of 32%. Chlorine gas evolution may be minimal because total chloride concentrations dropped no more than 3% (FIG. 8*c*). FIG. 8*c* also illustrates that chloride migrates out of the first chamber 402 during nitrate reduction, as desired to purify $NH_3$. Sustained high pH in the third chamber 406 (FIG. 8*d*) may ensure $NH_3$ does not protonate to $NH_4^+$, preventing it from returning to the second chamber 404 through the cation exchange membrane 410. Sustained low pH in the first chamber 402 may enhance $NO_3RR$. The pH of the second chamber 404 may be below the $NH_4^+/NH_3$ pKa (9.25), enabling migration across the cation exchange membrane 410 and >99% $NH_3$ recovery.

Figures 9B, 9C:
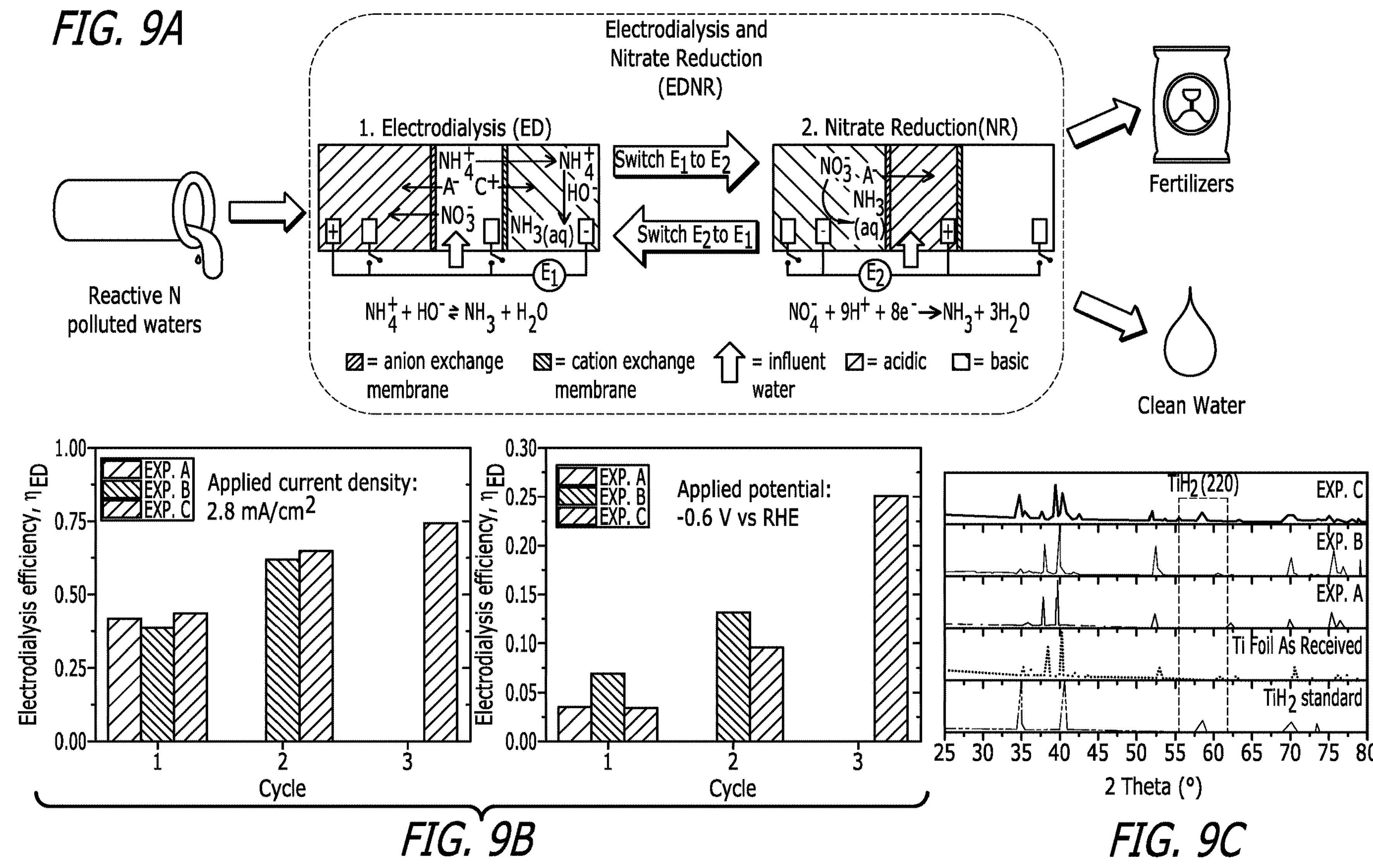
FIG. 9 illustrates a system where 3 cycles are performed.

Variation in the process may be produced by increasing cycle number. In some embodiments, 1 cycle may be performed. In some embodiments, 3 cycles may be performed. FIG. 9 illustrates a system where 3 cycles are performed. FIG. 9(*a*) is a EDNR diagram and application in wastewater remediation and fertilizer production. Influent enters the middle chamber and electrodes switch bias ($E_1$ and $E_2$) between stages. FIG. 9(*b*) illustrates results using simulated wastewater influent (100 ppm $NO3^-$+500 ppm $NH_4^+$). Electrodialysis efficiency, $$\eta_{ED}(\text{Cycle } j) = \frac{\{\text{molNH}_3\}_{Right,cycle\ j}}{\{\text{molNH}_4^+\}_{Middle,initial}}.$$

Nitrate reduction efficiency, $$\eta_{NR}(\text{Cycle } j) = \frac{\{\text{molNH}_3\}_{Left,cycle\ j}}{\{\text{molNO}_3^-\}_{Middle,initial}}.$$

FIG. 9(*c*) illustrate grazing incidence x-ray diffractograms (GIXRD) of Ti standards and post-reaction Ti electrodes. $TiH_2$ (220) is present on the Ti electrode from Exp. C (3 cycles).

The variation in right chamber ammonia recovery may be low (less than 5%) and corresponds to an average full cell potential of 5.5 volts, similar to other electrochemical treatment methods. The variation in first chamber 402 ammonia recovery is larger. Thus it may be beneficial to interrogate the surface of the Ti cathodes used in the EDNR experiments. With grazing incidence x-ray diffraction measurements a correlation was found between high-performing nitrate reduction and the presence of surface Ti-hydride species (see FIG. 9(*c*)). $NO_3^-$ conversion was highest for Ti after 3 EDNR cycles and exhibited $TiH_2$ features, with 1.3% lattice expansion observed (top 2 nm). This tensile surface strain may promote $NO_3RR$ activity and selectivity via (1) enhancing $NO_3^-$ adsorption by allowing more cations to stabilize oxyanions, (2) reducing the rate of adsorbed N (N*–N*) coupling by expanding distance between active sites, and (3) strengthening the adsorption of key intermediates (e.g., $NO_x$*) by up-shifting the d-band center. Control over formation of Ti-hydride for implementation into the EDNR process may increase ammonia yields and nitrate removal efficiency.

Figure 10:
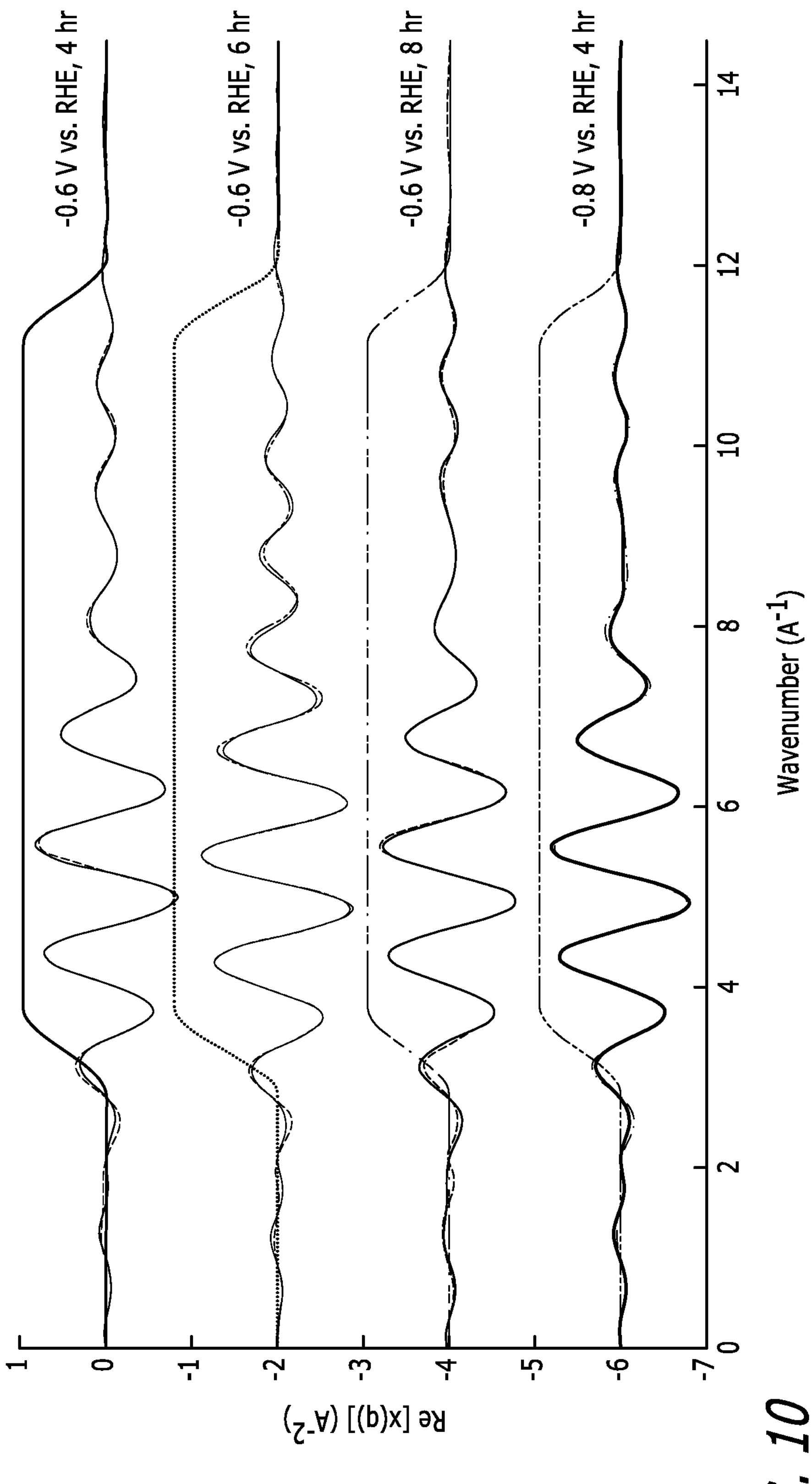
FIG. 10 illustrates first shell extended x-ray absorption fine structure (EXAFS) fittings of Ti cathodes that underwent various electrochemical environments.

In some embodiments, the proportion of surface Ti-hydride to pure Ti may be a function of both duration and magnitude of applied potential. FIG. 10 illustrates first shell extended x-ray absorption fine structure (EXAFS) fittings of Ti cathodes that underwent various electrochemical environments. Fits nearly overlay with the data in every wavenumber within the fitting window, suggesting accuracy in the trend in numbers presented in Table 1:

| Applied Potential ($E_{RHE}$) | Duration of Applied Potential (hr) | Ti atoms belonging to Tiα (hcp) | Ti atoms belonging to $TiH_2$ (fcc) |
|---|---|---|---|
| −0.6 | 4 | 5.4 ± 0.8 | 5.1 ± 1.3 |
| | 6 | 5.0 ± 0.9 | 5.8 ± 1.3 |
| | 8 | 4.7 ± 1.2 | 6.1 ± 1.6 |
| −0.8 | 4 | 3.3 ± 1.1 | 8.4 ± 1.2 |

Figure 11:
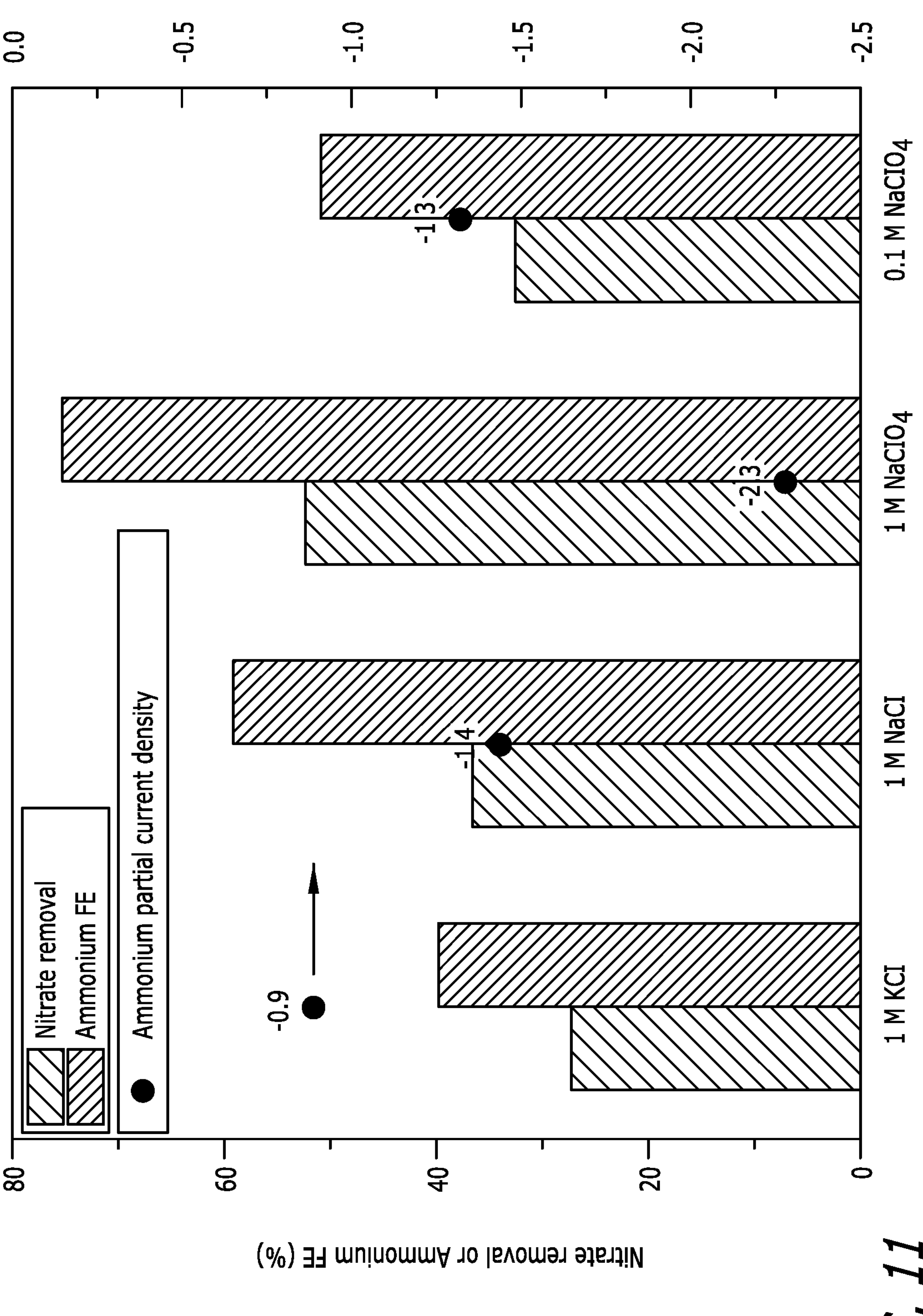
FIG. 11 illustrates a plot of influence of electrolyte composition (e.g. anion identity, cation identity and concentration) and electrolyte flow rate on $NO_3^-$ removal, $NH_3$ Faradaic efficiency (left axis) and $NH_3$ partial current density (right axis).

In some embodiments, the EDNR process may include electrolyte engineering. As an inner-sphere reaction involving multiple hydrogenation and electron-transfer steps, the reduction of $NO_3^-$ into $NH_4^+$ may be sensitive to competitive surface-adsorbing species, supply of protons and interfacial electric field. Therefore, nitrate reduction activity and $NH_4^+$ selectivity are significantly influenced by electrolyte pH and composition. In some embodiments, on Ti, nitrate reduction activity is 'turned on' in electrolytes with pH <2 but impeded again at pH 1.3 due to H* overly blocking surface sites. The ED stage may not only drives reactant $NO_3^-$ into the first chamber 402 but also determine the initial pH at the beginning of stage 2 (nitrate reduction). Co-adsorbing anions may also compete with $NO_3^-$ for surface sites. In some embodiments, on Ti cathodes, replacing strongly adsorbing $Cl^-$ in the supporting electrolyte with weakly adsorbing $ClO_4^-$ increases nitrate removal (reflects nitrate reduction activity) by 38%. FIG. 11 illustrates a plot of influence of electrolyte composition (e.g. anion identity, cation identity and concentration) and electrolyte flow rate on $NO_3^-$ removal, $NH_3$ Faradaic efficiency (left axis) and $NH_3$ partial current density (right axis). In some embodiments, HNO3 may be of concentration of 10 mM at −1 V vs. RHE. Cations can influence both nitrate reduction activity and selectivity by 1) titrating near-electrode pH with waters of hydration and 2) inducing interfacial electric fields that change the adsorption energy of reaction intermediates. Compared to $K^+$, $Na^+$ significantly promotes both $NO_3^-$ removal (by 35%) and $NH_4^+$ Faradaic efficiencies (FE, reflects $NH_4^+$ selectivity, by 50%). Higher cation concentration may also help to improve both metrics.

Figure 12:
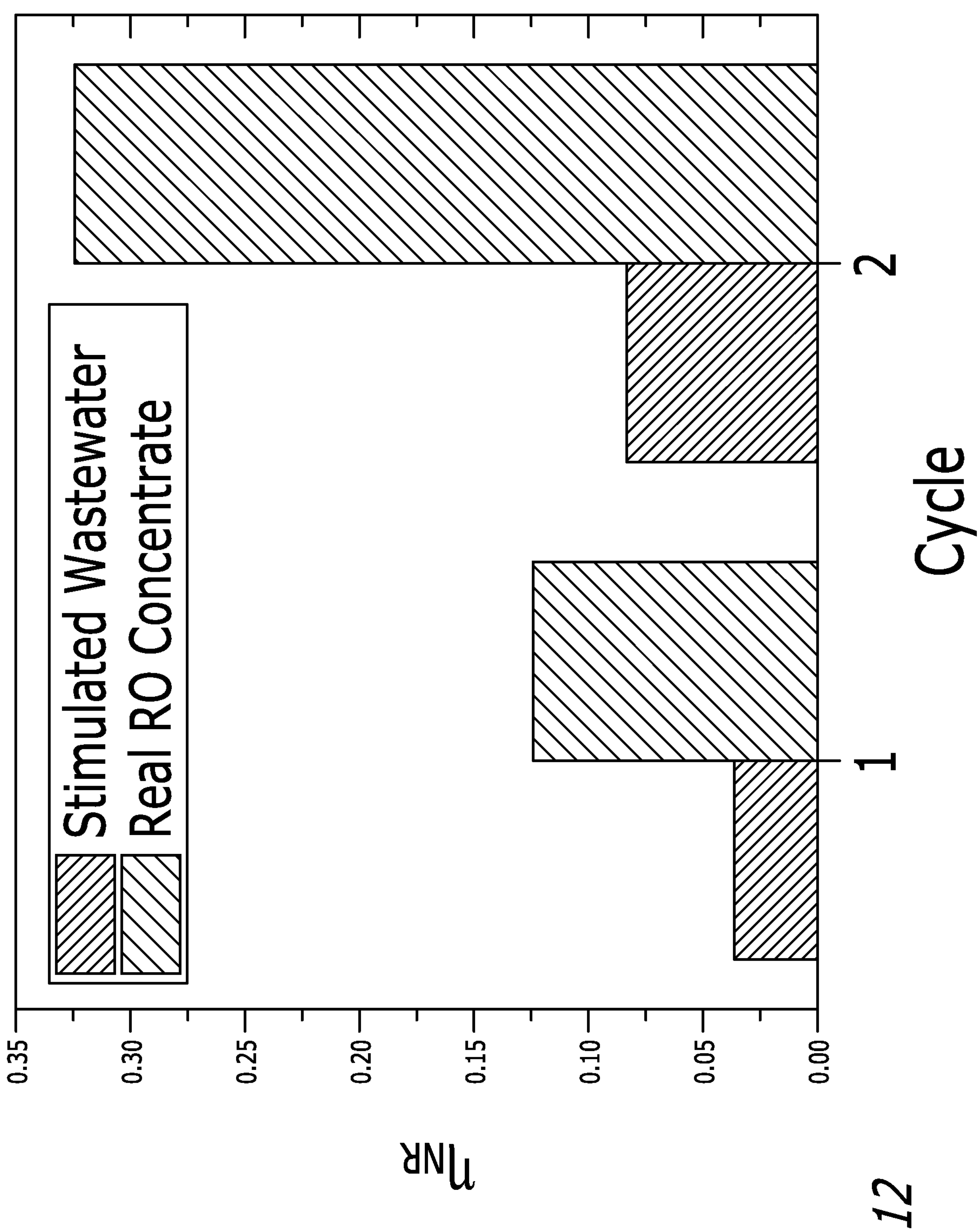
FIG. 12 is a plot of nitrate reduction efficiency vs. EDNR cycle for simulated wastewater and real wastewater concentrate.

In some embodiments, Ti-hydride ($TiH_x$, x=0-2) species (electrocatalyst engineering) may be formed and electrolyte cation identity and concentration (electrolyte engineering) may be changed with real wastewater influent (e.g. RO concentrate from municipal wastewater reuse facility in Monterey, CA). In some embodiments, with the same reactor setup and operating parameters but improved reactor design, a nitrate reduction efficiency of 32.4% may be achieved achieved after two cycles, a 4× increase compared to situations with synthetic solution, indicating that EDNR may be applied to real wastewaters. FIG. 12 is a plot of nitrate reduction efficiency vs. EDNR cycle for simulated wastewater and real wastewater concentrate (e.g. derived from municipal wastewater), in which Ti-hydride was formed prior to use in real wastewater concentrate. In some embodiments, varying EDNR cycle frequency and duration may affect nitrate reduction performance, which may occur via electrodialysis-induced changes (e.g., interfacial pH). For applied potential, maximum $NO_3^-$ conversion may occur at −0.7 V vs. RHE and may vary with higher resolution to characterize several regimes.

EXEMPLARY EMBODIMENTS

The disclosure presents the following prophetic examples according to embodiments. It will be understood that these examples are merely exemplary and are not meant to limits in any way the overall scope of the disclosure or embodiments.

Example 1: Embodiments Demonstrating the Role of Electrolyte in Dictating Reaction Mechanisms for Electrochemical Nitrate Reduction to Ammonia and Prioritize Effects of Bulk and Interfacial Parameters in Synthetic Wastewaters Because the interfacial environment can drastically impact chemical transport and transformations, mechanistic and electrocatalytic observations made in a particular electrolyte environment may not directly translate to different electrolyte systems. To date, studies have demonstrated that $NO_3RR$ reaction rates and product speciation depend on bulk electrolyte properties such as presence of competing anions, nitrate concentration, and as has been recently shown, pH. Some embodiments these electrolyte effects may allow for the investigation of wastewater-relevant cation identities (e.g., $K^+$, $Na^+$, $Ca^{2+}$, $Mg^{2+}$), cation concentrations, and solution viscosities, and by attempting to characterize interfacial intermediates and reaction mechanisms.

In some embodiments, $NO_3RR$ selectivity and production rates may increase with cation charge, concentration, and size (decreasing order of sensitivity) due to stabilizing surface intermediates. Direct and alternating current measurements may be coupled with product quantification via gas and ion chromatography to interrogate the impact of these parameters on $NO_3RR$ selectivity, rate, and other relevant metrics such as double-layer capacitance.

After adsorption at the interface, $NO_3^-$ may undergo electroreduction to $NO_2^-$, the reactive rate-limiting step of $NO_3RR$. The electrochemical-chemical-electrochemical mechanism may involve 3 steps:

$$NO_{3(ad)}^- + e^- \rightarrow NO_{3(ad)}^{2-} \quad [1]$$

$$NO_{3(ad)}^{2-} + H_2O \rightarrow NO_{2(ad)}^{\cdot} + 2HO^- \quad [2]$$

$$NO_{2(ad)}^{\cdot} + e^- \rightarrow NO_{2(ad)}^- + H_2O \quad [3]$$

In various embodiments, the lifetime of $NO_3^{2-}$ increases with increasing cation charge, concentration, and size, all of which lower the activity of water and the activation energy of reaction 2. It is expected that the charge may have the largest impact on intermediate stability due to its quadratic effect on ionic strength, followed by concentration's linear effect and size's minimal effect. Cation identity and concentration can also impact electron transfer steps (reactions 1 and 3) by bridging bulk nitrate to the cathode and by stabilizing surface intermediates, both of which increase $NO_3RR$ selectivity and rates. Conversely, viscous wastewaters may hinder $NO_3RR$ because a threefold increase in solution viscosity (raw sewage has three times the viscosity of nanopure water) can decrease heterogeneous rate constants tenfold due to slowed solvent dielectric relaxation and thermal reorientation. These findings may inform EDNR operation for real wastewaters of varying composition.

Example 2: Embodiments Implementing an Operational EDNR Device for On-Site Ammonia Manufacturing and Water Purification in Real Wastewaters The scientific principles underpinning $NO_3RR$ from studies of electrolyte and electrode effects enable construction of operable EDNR devices. Embodiments implement rational design to maximize efficiency, which may require device-scale electrochemical engineering because performance depends on cell architecture and mass transport. Many embodiments may implement processes for manipulating stability (via separate, distant electrodes) and activity (via local pH) to maximize $NO_3RR$ activity and selectivity toward $NH_3$.

EDNR device configurations according with various embodiments of the invention may require each electrode to perform oxidation and reduction (e.g., left electrode performs OER and $NO_3RR$). This constraint can be relaxed by using two electrodes, one that performs OER and another that performs $NO_3RR$.

Figure 13:
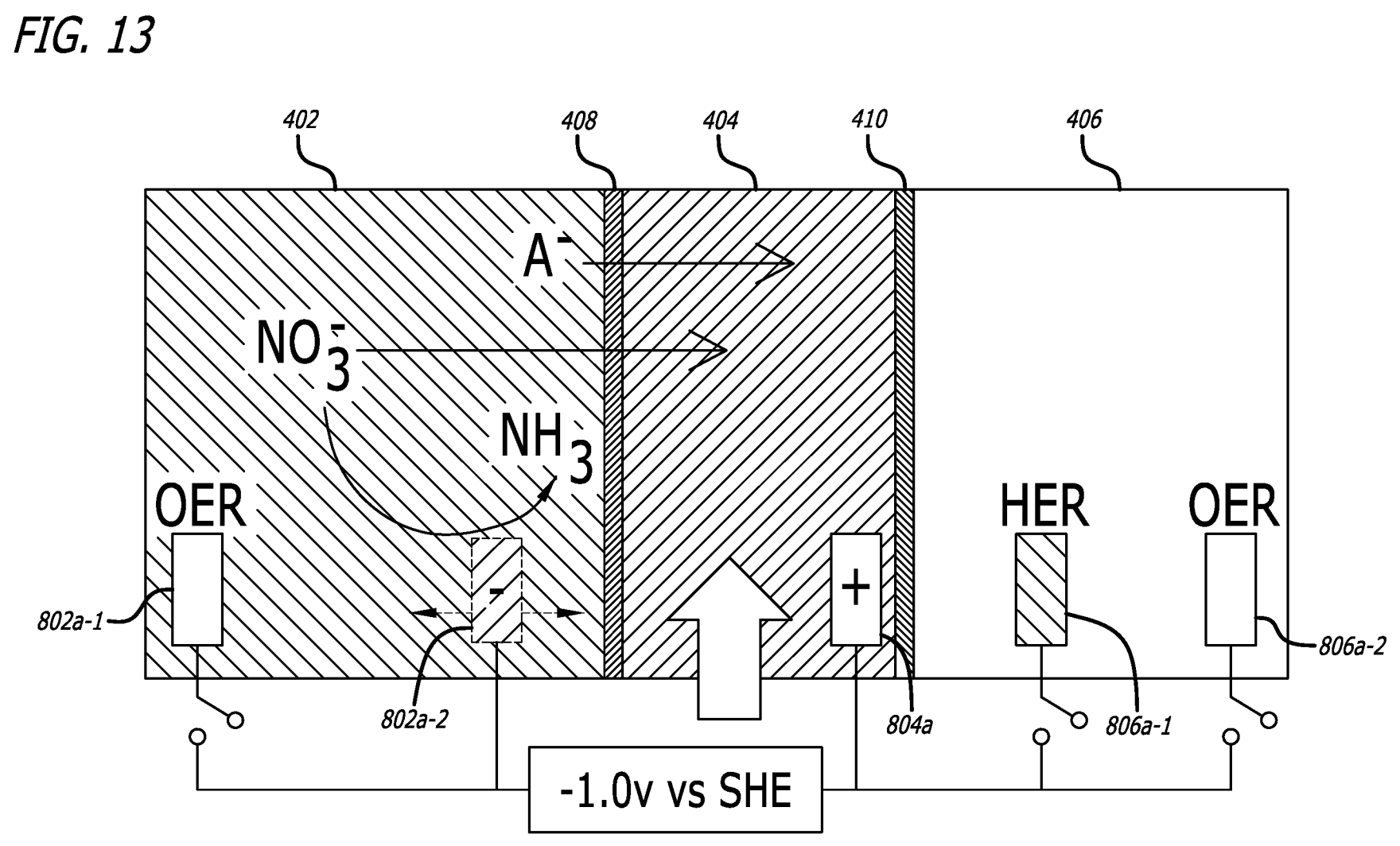

FIG. 13 illustrates a diagram of an ENDR device in $NO_3RR$ (Stage 2) with dual electrodes in the first chamber 402 and the third chamber 406 according to an embodiment of the invention. The first chamber 402 includes a $NO_3RR$ electrode 802_a_-2, positioned at varying distances from a OER electrode 802_a_-1 and anion exchange membrane 408. The third chamber 406 includes a HER electrode 806_a_-1 in accordance with an embodiment of the invention. Implementing this strategy in the first chamber 402 may be a OER/$NO_3RR$ chamber and the third chamber 406 may be a HER/OER chamber which may be in a five-electrode configuration with several advantages.

In addition to relieving electrochemical stability restraints (e.g., requiring the $NO_3RR$ electrode 802_a_-2 to be chemically rather than electrochemically stable in acid), the five-electrode architecture may facilitate finer control of $NO_3^-$ concentration in the first chamber 402, which may influence $NO_3RR$ selectivity and activity. Embodiments may manipulate $NO_3^-$ concentration by changing applied potential at the OER electrode 802_a_-1 and by varying the position of the $NO_3RR$ electrode 802_a_-2, which may exhibit maximal activity when placed adjacent to the anion exchange membrane 408 to "intercept" migrating $NO_3^-$. Some embodiments may include ideal electrode placements and potential magnitudes that promote efficient electrodialysis and $NO_3RR$, as well as compare the realizable advantages of the five- and three-electrode architectures.

The current waveform applied to the EDNR device may influence $NO_3RR$ selectivity and activity, as the duration and magnitude of the applied current may define the local pH at the electrode surface. Like $NO_3^-$ concentration, pH affects electrocatalytic activity and selectivity. Using scanning electrochemical microscopy (SECM) may characterize interfacial pH at various electrodes and modify the applied current waveform to maintain the desired local pH that maximizes $NH_3$ yield and selectivity. The local pH may further be a function of the flow rate and agitation of the water moving through the device, and these parameters may be optimized in concert with applied current to again maximize $NO_3RR$ efficiency. The evolution of gases ($H_2$, $N_2$, $O_2$) at the various electrodes as a function of applied current may also be considered to manage device pressure (e.g., top holes open to atmosphere for each chamber to vent gases). Ultimately, embodiments may be fabricated with robust electrochemical membrane reactors with carefully selected catalyst characteristics, ion transport, and pressure management and demonstrate their performance in real wastewaters.

Embodiments may demonstrate the role of electrolyte on nitrate reduction mechanisms; identify molecularly designed electrocatalysts that maximize ammonia production from nitrate; and combine these insights to develop a functional EDNR device with unprecedented activity, stability, and activity in real wastewaters. Achieving these outcomes may show that electrolyte effects may play a non-negligible role, and elucidate the impact of real wastewater constituents on nitrate reduction.

Figures 14A, 14B:
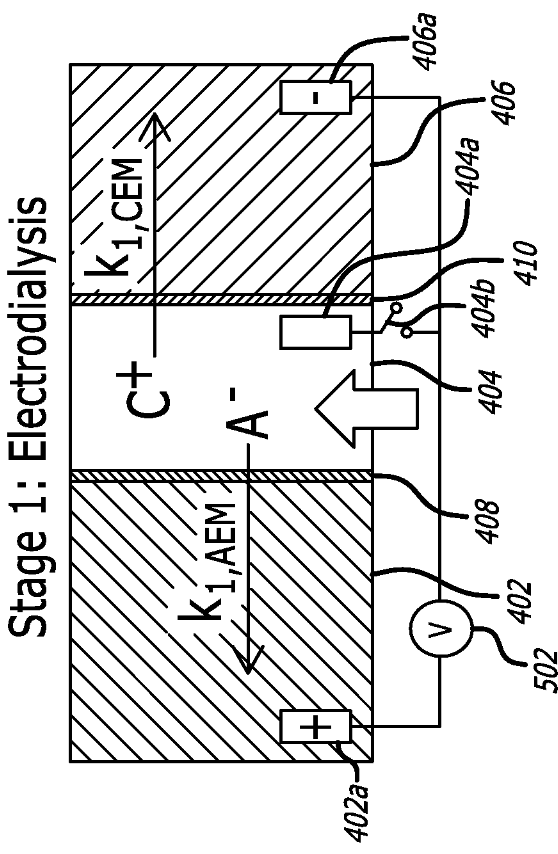
FIG. 14A illustrates a schematic of Stage 1 (electrodialysis), illustrating mass transfer coefficients across anion exchange membrane (AEM) and cation exchange membrane (CEM) in accordance with an embodiment of the invention.
FIG. 14B illustrates a conceptual graph of mass transfer coefficients of each stage relative to Stage 1.

Example 3: Embodiments Validating a Mass Transport and Reaction Model that Elucidates the Effects of Operating Parameters on Rates, Yields, and Selectivity of EDNR Ammonia Synthesis and Recovery A sensitivity analysis of EDNR operating parameters on ammonia production may be conducted by constructing a differential mass transport and reaction model that describes transient $NH_4^+$, $NH_3$, and $NO_3^-$ concentrations measured. Based on previous work modeling mass transport during electrochemical nitrogen stripping, it may be possible to calculate transmembrane ion mass transfer coefficients during each stage (e.g., applied potential) of EDNR. FIG. 14A illustrate a schematic of a system in Stage 1 500_a_ (electrodialysis) of FIG. 5 in accordance with an embodiment of the invention. Mass transfer coefficients across the anion exchange membrane (AEM) 408 and cation exchange membrane (CEM) 410, where the subscript on k denotes Stages 1-3 of EDNR process from FIG. 5. FIG. 14B illustrates a conceptual graph of mass transfer coefficients of each stage relative to Stage 1.

With ECS, transmembrane mass transfer coefficients may be compared under varying temperatures, membrane pore sizes, and influent nitrogen concentrations; doing so may help determine the rate-limiting step of the entire process, which was ammonia volatilization. In EDNR, potential (EDNR stage) and pH (stage duration) may dictate rates, yields, and selectivity of ammonia production.

To incorporate nitrate reduction into embodiments of the mass transport and reaction model, it may be possible to use the low overpotential region of Tafel plots to estimate exchange-current densities for various wastewater/electrode systems. By systematically determining both reorganization energy and exchange-current densities across several wastewaters and electrode materials, it may be possible to gain a fundamental understanding of the molecular reaction and transport processes governing $NH_3$production, along with their relative contributions in varying environments. This comprehensive data set may facilitate identification of conserved predominant mass transfer and reaction steps, as well as those unique to certain wastewaters or electrode materials.

Mass transport and reaction models may be supplemented with reaction engineering that evaluates the effect of operating parameters on ammonia synthesis and recovery rates, selectivity, and yields. Some embodiments may test and prioritize several operating variables, including potential for each stage, duration in each stage, temperature, flow rate/residence time, influent nitrate concentration, and pH in each chamber. Model and hypotheses concerning rate-limiting steps may be validated by comparing modeled and measured mass transfer parameters. By prioritizing these operating parameters, it may be possible to facilitate identification of key parameters and dimensionless groups that describe the major determinants of ammonia selectivity, rates, and yields. For example, ammonia loading (mass of $NH_3$/flow rate) has been identified in electrodialytic $NH_3$ recovery as a descriptor of recovery efficiency. Results from these embodiments may facilitate careful and dynamic control of reactor design parameters to maximize ammonia production. This fundamental understanding and process engineering may be used to enable decentralized, automated operation and control of electrochemical ammonia synthesis and recovery.

Example 4: Embodiments Implementing Techno-Economic (TEA) and Life-Cycle Assessments (LCA) to Compare EDNR to Existing Nitrogen Management Techniques and Prioritize Components for Future Optimization Embodiments of EDNR include energy-, cost-, and input-competitive with the sum of conventional aqueous nitrogen removal via nitrification-denitrification and HB ammonia synthesis. To analyze EDNR, it may be possible to consider two functional units: kg of nitrogen removed from wastewater and kg of $NH_3$-N produced. The overall system boundary may be deconvoluted into wastewater purification and fertilizer production, the two value propositions fulfilled by distributed electrochemical nitrogen recovery. By identifying Pareto optima for recovery efficiency and chemical inputs, it may be possible to also determine optimal scale to facilitate distributed chemical manufacturing.

Energy input, greenhouse gas emissions, and cost may be calculated by creating a life-cycle inventory of all chemical and energetic inputs using economic input-output LCA and embedded energy from process LCA. Some embodiments may include calculated pumping energies for wastewaters, electrolytes, chemical inputs, and produced ammonia. Once open-source models are built and calibrated, some embodiments may evaluate a broad landscape of detailed operational decisions (e.g., scale, electrochemical potential) through a quantitative sustainable design process that integrates process modeling, TEA, and LCA under uncertainty. Parameters for sensitivity and uncertainty analyses may be included, but are not limited to, influent wastewater composition, fertilizer application rates, rain events, unit costs, and other relevant model parameters to understand their implications for N discharge, cost, energy, and life cycle environmental impacts. Embodiments may assume uniform probability density functions. Monte Carlo simulations with Latin Hypercube Sampling may be used for uncertainty analysis, with at least 10,000 runs. Sensitivity analyses may be used to determine the robustness of the conclusions and the most impactful parameters for future optimization.

Figure 15:
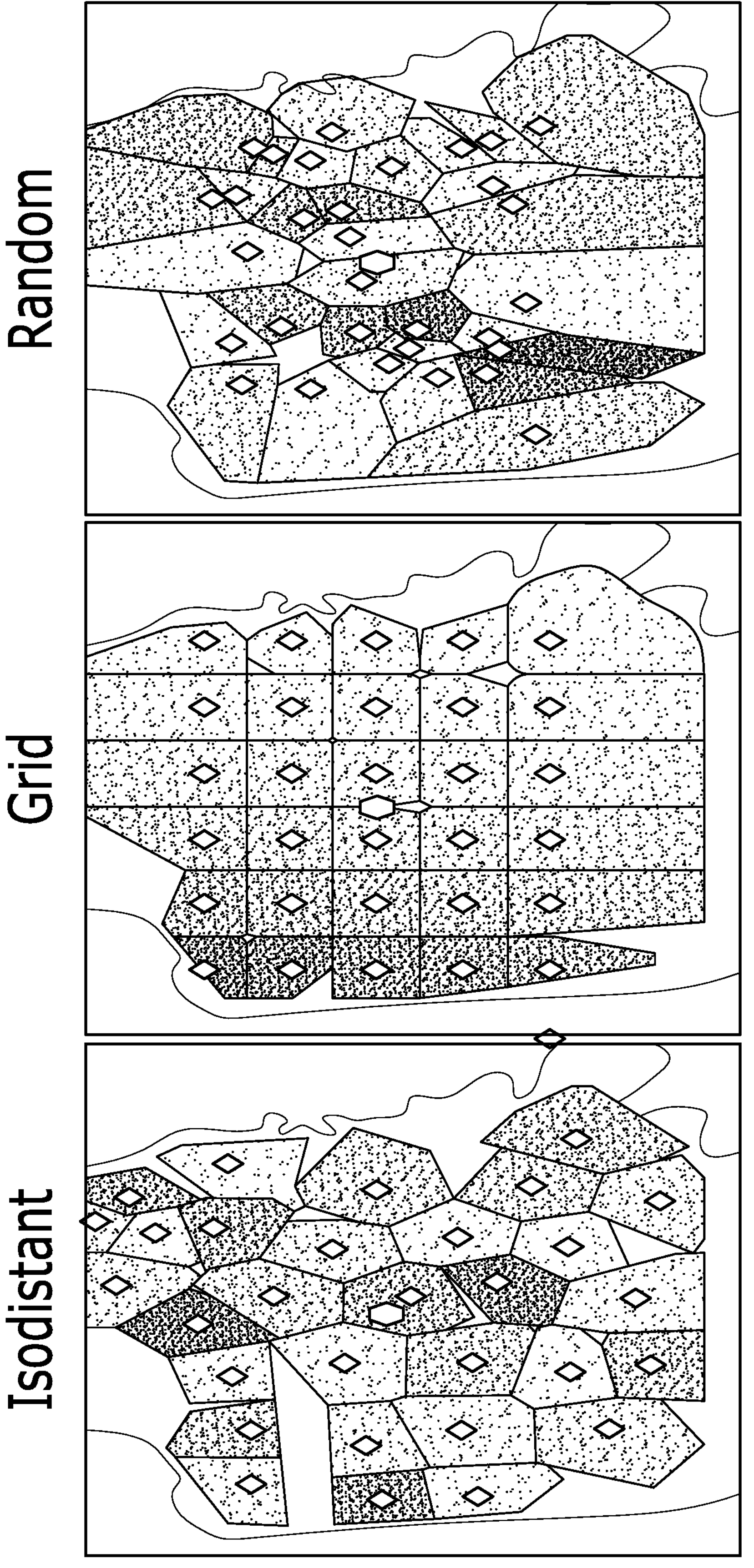
FIG. 15 illustrates distributed manufacturing sites with three different methods in San Francisco: isodistant (equal service area per facility, minimizes transport distance), grid (facilities equidistant from one another), and random (based on location availability) accordance with an embodiment of the invention.

Example 5: Embodiments Implementing Estimates of Regional Supply of Nitrogen-Polluted Wastewaters and Characterize Technology Diffusion Pathways for EDNR To enable EDNR implementation and uptake, some embodiments may develop a process to identify areas with surplus supply of N-polluted waters. FIG. 15 illustrates distributed manufacturing sites according with some embodiments with three different methods in San Francisco: isodistant (equal service area per facility, minimizes transport distance), grid (facilities equidistant from one another), and random (based on location availability). Geospatial modeling may help determine optimal configurations of distributed ammonia production plants based on various installation scenarios. Some embodiments may elucidate technology diffusion pathways by identifying local drivers (e.g., local regulations) and barriers (e.g., sunk cost in HB) for EDNR adoption.

FIG. 16 illustrates a table summarizing estimates of $NH_3$ production from various wastewaters via EDNR accordance with some embodiments compared to HB, where the estimated "typical" installation flow rates, and concentrations of $NO_3^-$ and $NH_4^+$ are provided. Estimates of $NH_3$ production from wastewater installations to plant-scale and global HB synthesis may be used. Globally, recovering N from municipal wastewater alone could offset 30% of current HB production (based on similar calculations). By comparing EDNR to conventional N management, some embodiments may demonstrate advantages of EDNR, prioritize efforts to reduce emissions and inputs, and identify ideal sites for distributed ammonia synthesis and recovery from wastewater. These activities may help translate the fundamental science to measurable impact and implementation by defining paths to widespread adoption. Even if unoptimized EDNR does not yet show advantages to conventional N management, the identification of optimization opportunities and favorable conditions may guide future efforts to valorize wastewater nitrogen.

Doctrine of Equivalents

As can be inferred from the above discussion, the above-mentioned concepts can be implemented in a variety of arrangements in accordance with embodiments of the invention. Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An apparatus for nitrogen reduction of wastewater comprising:
   - a first chamber comprising a salt solution and a first electrode;
   - a second chamber comprising a wastewater source and a second electrode;
   - a third chamber comprising a salt solution and a third electrode, wherein the second chamber is positioned between the first chamber and the third chamber;
   - an anion exchange membrane positioned between the first chamber and the second chamber; and
   - a cation exchange membrane positioned between the second chamber and the third chamber,
   - wherein the first electrode is electrically connected to a first switch, the second electrode is electrically connected to a second switch, and the third electrode is electrically connected to a third switch,
   - wherein each of the first switch, the second switch, and the third switch are electrically connected to a voltage source, and
   - wherein any two of the first switch, the second switch, or the third switch are configured to engage to create a potential bias between their corresponding chambers.

2. The apparatus of claim 1, further comprising an $NO_3RR$ electrode positioned in the first chamber.

3. The apparatus of claim 2, wherein the $NO_3RR$ electrode and the first electrode are each configured to apply a potential bias to the first chamber.

4. The apparatus of claim 2, wherein the $NO_3RR$ electrode and the first electrode are spaced apart from each other.

5. The apparatus of claim 1, further comprises a HER electrode positioned in the third chamber.

6. The apparatus of claim 5, wherein the HER electrode and the third electrode are each configured to apply a potential bias to the third chamber.

7. The apparatus of claim 5, wherein the HER electrode and the third electrode are spaced apart from each other.

8. The apparatus of claim 1, wherein the first switch, the second switch, and third switch are electrically connected to a voltage source.

9. The apparatus of claim 8, wherein the voltage source is reversable.

10. The apparatus of claim 1, wherein the first electrode and/or the second electrode comprises a metal oxide mesh material.

11. The apparatus of claim 10, wherein the metal oxide mesh material comprises $TiO_2$, $IrO_2$ and/or $Ta_2O_5$.

12. The apparatus of claim 1, wherein the third electrode comprises stainless steel.

13. A method of nitrogen reduction of wastewater, the method comprising:

providing an apparatus comprising:

a first chamber comprising a salt solution and a first electrode;

a second chamber comprising a wastewater source and a second electrode;

a third chamber comprising a salt solution and a third electrode, wherein the second chamber is positioned between the first chamber and the third chamber;

an anion exchange membrane positioned between the first chamber and the second chamber; and a cation exchange membrane positioned between the second chamber and the third chamber;

wherein the first electrode is electrically connected to a first switch, the second electrode is electrically connected to a second switch, and the third electrode is electrically connected to a third switch, and wherein each of the first switch, the second switch, and the third switch are electrically connected to a voltage source;

applying a potential bias between any two of the first switch, the second switch, and the third switch and their corresponding chambers.

14. The method of claim 13, further comprising performing electrodialysis by applying an ionizing potential bias with a negative polarity to the third chamber and a positive polarity to the first chamber.

15. The method of claim 14, further comprising performing nitrate reduction by applying an ionizing potential bias with a negative polarity to the first chamber and a positive polarity to the second chamber.

16. The method of claim 15, further comprising performing product purification by applying an ionizing potential bias with a negative polarity to the second chamber and a positive polarity to the third chamber.

17. The method of claim 13, further comprising performing disinfectant production by applying an ionizing potential bias with a negative polarity to the third chamber and a positive polarity to the second chamber.

18. The method of claim 17, further comprising performing anion migration by applying an ionizing potential bias with a negative polarity to the second chamber and a positive polarity to the first chamber.

19. The method of claim 18, further comprising performing nitrate reduction by applying an ionizing potential bias with a negative polarity to the first chamber and a positive polarity to the second chamber.

20. The method of claim 19, further comprising performing fertilizer production by applying an ionizing potential bias with a negative polarity to the second chamber and a positive polarity to the first chamber.

* * * * *